United States Patent [19]

Ishidoya et al.

[11] Patent Number: 5,419,929
[45] Date of Patent: * May 30, 1995

[54] THERMOSETTING COMPOSITIONS, THERMAL LATENT ACID CATALYSTS, METHODS OF COATING AND COATED ARTICLES

[75] Inventors: Masahiro Ishidoya, Kamakura; Kishio Shibato, Yokohama; Keiji Komoto, Tokyo; Kenji Shibamoto, Yokohama; Mitsuyuki Mashita, Yokohama; Osamu Ohe, Yokohama, all of Japan

[73] Assignee: Nippon Oil and Fats Company, Limited, Tokyo, Japan

[*] Notice: The portion of the term of this patent subsequent to Oct. 4, 2011 has been disclaimed.

[21] Appl. No.: 948,017

[22] Filed: Sep. 21, 1992

Related U.S. Application Data

[63] Continuation-in-part of Ser. No. 680,356, Apr. 4, 1991, Pat. No. 5,352,740.

[30] Foreign Application Priority Data

| Apr. 10, 1990 | [JP] | Japan | 2-094267 |
| Sep. 28, 1990 | [JP] | Japan | 2-259695 |
| Oct. 26, 1990 | [JP] | Japan | 2-288776 |
| Mar. 28, 1991 | [JP] | Japan | 3-089510 |
| Oct. 3, 1991 | [JP] | Japan | 3-283514 |
| Oct. 3, 1991 | [JP] | Japan | 3-283515 |
| Oct. 7, 1991 | [JP] | Japan | 3-287129 |
| Oct. 7, 1991 | [JP] | Japan | 3-287130 |
| Mar. 18, 1992 | [JP] | Japan | 4-091985 |
| Mar. 18, 1992 | [JP] | Japan | 4-092240 |
| Mar. 24, 1992 | [JP] | Japan | 4-097055 |
| Mar. 24, 1992 | [JP] | Japan | 4-097057 |
| Mar. 24, 1992 | [JP] | Japan | 4-097058 |
| Aug. 31, 1992 | [JP] | Japan | 4-255847 |

[51] Int. Cl.⁶ .................... C08L 29/00; C08L 33/00; C08L 37/00; C08L 67/02
[52] U.S. Cl. .................... 427/386; 427/385.5; 525/167; 525/175; 525/176; 525/206; 525/208; 525/209; 525/212; 525/217; 525/220; 525/221; 525/223; 525/437; 525/438; 525/440; 525/444; 525/446
[58] Field of Search ............... 525/208, 223, 221, 206, 525/212, 209, 217, 220, 175, 176, 167, 444, 437, 438, 440, 446; 427/385.5, 386

[56] References Cited

U.S. PATENT DOCUMENTS 3,505,297 4/1970 Sheetz et al.
(List continued on next page.)

FOREIGN PATENT DOCUMENTS 672947 10/1963 Canada.
(List continued on next page.)

OTHER PUBLICATIONS

File Supplier PAJ/JPO abstract of JP-A-4081419, Mar. 1992.
(List continued on next page.)

*Primary Examiner*—Patricia A. Short
*Attorney, Agent, or Firm*—Frishauf, Holtz, Goodman & Woodward

[57] ABSTRACT

Thermosetting composition comprises a compound having in the molecule two or more carboxyl groups blocked by a vinyl ether compound, a vinyl thioether compound or a hetero compound having a vinyl type double bond and oxygen or sulfur as the hetero atom, a compound having two or more reactive functional groups which can form a chemical bond with the blocked carboxyl compound by heating, a specific vinyl ether or vinyl thioether and a thermal latent acid catalyst. The blocked carboxyl group of the first compound and the reactive functional group of the second compound may be comprised in the same molecule. The thermosetting composition gives cured products having excellent chemical properties, physical properties, weathering resistance and storage stability and is advantageously utilized for coating compositions, ink, adhesive and molded plastics.

36 Claims, No Drawings

U.S. PATENT DOCUMENTS

| | | |
|---|---|---|
| 3,679,618 | 7/1972 | Lohr . |
| 4,132,686 | 1/1979 | Toyoshima et al. . |
| 4,371,667 | 2/1983 | Möller et al. . |
| 4,579,937 | 4/1986 | Masuda et al. . |
| 4,650,718 | 3/1987 | Simpson et al. . |
| 4,681,811 | 7/1987 | Simpson et al. . |
| 4,703,101 | 10/1987 | Singer et al. . |
| 4,764,430 | 8/1988 | Blackburn et al. . |
| 4,769,400 | 9/1988 | Geist et al. ............ 563/408 |

FOREIGN PATENT DOCUMENTS

| | | |
|---|---|---|
| 0029595 | 6/1981 | European Pat. Off. . |
| 4081419 | 3/1992 | Japan . |
| 178626/1992 | 2/1992 | Taiwan, Prov. of China . |
| 54563/1992 | 6/1992 | Taiwan, Prov. of China . |

OTHER PUBLICATIONS

Derwent Abstract of JP 4072324, Mar. 1992.
Derwent Abstract of JP 2-115238, Apr. 1990.
Derwent Abstract of JP 1-104646, Apr. 1989.
Derwent Abstract of JP 60-88038, May 1985.
Derwent Abstract of JP 51-114429, Oct. 1976.
Derwent Abstract of JP-A-4080242, Mar. 1992.
Derwent Abstract of JP 4076015, Mar. 1992.
Chemical Abstracts, vol. 109, No. 4, Jul. 25, 1988, Uzawa, A., "Light-stabilized polymer compositions", p. 32, Abstract No. 23846p.
Chemical Abstracts, vol. 109, No. 4, Jul. 25, 1988, Uzawa, A., "Lightt-stabilized polymer compositions", p. 32, Abstract No. 23848r.

THERMOSETTING COMPOSITIONS, THERMAL LATENT ACID CATALYSTS, METHODS OF COATING AND COATED ARTICLES

This application is a continuation-in-part of application Ser. No. 07/680,356, filed Apr. 4, 1991, now U.S. Pat. No. 5,352,740.

BACKGROUND OF THE INVENTION

1. Field of the Invention

The present invention relates to novel thermosetting compositions, thermal latent catalysts, methods of coating and coated articles. More particularly, it relates to novel thermosetting compositions having excellent chemical properties, physical properties, weathering resistance and storage stability and methods of coating to provide a top coating having the excellent properties as described above and excellent appearance by using the thermosetting compositions as the top coating material.

2. Description of the Prior Art

It is generally known that thermosetting compositions can be prepared from compounds having carboxyl groups and compounds having reactive functional groups which can form chemical bonds with the carboxyl groups by heating, such as epoxy group, oxazoline group, silanol group, alkoxysilane group, hydroxyl group, amino group, imino group, isocyanate group, blocked isocyanate group, cyclocarbonate group, vinyl ether group, vinyl thioether group, aminomethylol group, alkylated aminomethylol group, acetal group and ketal group. The thermosetting compositions give cured products having excellent chemical properties, physical properties and weathering resistance and are widely utilized in the field of coating composition, ink, adhesive and molded plastics.

As thermosetting compositions described above, for example, compositions comprising combinations of carboxyl group and epoxy group have been disclosed in Laid Open Japanese Patent Application Showa 51-114429, Laid Open European Patent Application 29595 and U.S. Pat. Nos. 4,371,667, 4,650,718, 4,681,811, 4,703,101 and 4,764,430.

Compositions comprising combinations of carboxyl group and oxazoline group, as other examples, have been disclosed in U.S. Pat. No. 3,505,297 and Laid Open Japanese Patent Applications Showa 60-88038 and Heisei 2-115238.

The thermosetting compositions give cured products having excellent chemical properties, physical properties and weathering resistance and are widely utilized in the field of coating composition, ink, adhesive and molded plastics.

However, the reactivity between the carboxyl group and the reactive functional groups is generally very high and compositions in which compounds having carboxyl groups and compounds having the reactive functional groups are mixed together have a problem that the compositions are often gelled during storage and the period suitable for service is short.

Compounds comprising carboxyl groups conventionally utilized for thermosetting compositions described above have problems that solubility to generally used solvents is low and that compatibility with the compounds having reactive groups with the carboxyl group is inferior because of the tendency of the carboxyl group to form strong hydrogen bonds. When thermosetting compositions comprising these kinds of compounds are utilized as top coating materials, they naturally have problems that preparation of high solid coating materials is difficult and that appearance of the finished coating is inferior.

For the purpose of solving these problems, it was proposed that carboxyl group was blocked by converting it to tertiary-butyl ester and the free carboxyl group was regenerated by elimination of isobutene by heating (Laid-Open Japanese Patent Application Heisei 1-104646). However, this method required a high temperature, such as 170°-200° C., for the heat decomposition of the tertiary-butyl ester and pock marks which were made by foaming and degassing of isobutene formed by the decomposition remained on the cured surface of the coating. Thus, this method is not satisfactory.

SUMMARY OF THE INVENTION

The present invention accordingly has an object to provide thermosetting compositions which give cured products having excellent chemical properties, physical properties, weathering resistance and storage stability and can be utilized as high solid one component coating materials. Another object of the invention is to provide thermal latent acid catalysts which give excellent storage stability and excellent curing property simultaneously to the thermosetting compositions.

Still other objects of the invention are to provide methods of coating which discharge little amount of organic solvents into air and give excellent appearance to the finished articles and to provide articles prepared by utilizing the methods of coating.

Extensive investigations undertaken by the present inventors with the objects described above lead to a discovery that the objects can be achieved by a composition comprising, essentially, (A) a compound having in the molecule two or more carboxyl groups which are blocked by a specific vinyl ether group, vinyl thioether group or heterocyclic group having vinyl type double bond and oxygen or sulfur as the hetero atom component; essentially, (B) a compound having in the molecule two or more reactive functional groups which can form chemical bonds with the blocked carboxyl groups by heating, essentially, (E) a specific vinyl ether or a specific vinyl thioether and, optionally, (C) a thermal latent acid catalyst which is activated during curing by heating; by a composition comprising, essentially, (D) a self-crosslinking compound having in the molecule one or more blocked carboxyl groups and one or more reactive functional groups which can form chemical bonds with the blocked carboxyl groups by heating, essentially, (E) a specific vinyl ether or a specific vinyl thioether, optionally, (C) a thermal latent acid catalyst described above and, optionally, the compound (A) and/or the compound (B); by a composition comprising, essentially, the compound (A), essentially, the compound (B) and, essentially, (F) a specific thermal latent acid catalyst which is activated during curing by heating; by a composition comprising, essentially, the compound (D) and, essentially, the compound (F) and, optionally, the compound (A) and/or the compound (B); and by a composition comprising, essentially, the compound (A), essentially, (G) a compound having two or more oxazoline groups in the molecule and, optionally, (C) a thermal latent acid catalyst which is activated during curing by heating. It was also discovered that the method of coating utilizing the thermosetting composition having the advantageous properties as the top coating material discharges little amount of organic solvents into air and gives excellent appearance to the finished articles. The present invention was completed on the basis of the discovery described above.

Thus, the thermosetting compositions of the invention comprise: essentially, (A) a compound having in the molecule two or more functional groups of the formula [1]:

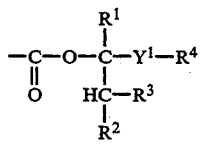
[1]

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hetero atom component; essentially, (B) a compound having in the molecule two or more reactive functional groups which can form chemical bonds with the functional groups of the compound (A) by heating; essentially, (E) a compound of the formula [2]:

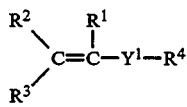
[2]

wherein $R^1$, $R^2$, $R^3$, $R^4$ and $Y^1$ have the same meaning as in the compound (A); and, optionally, (C) a thermal latent acid catalyst which is activated during curing of the composition by heating.

The thermosetting composition of the invention also comprise: essentially, (D) a self-crosslinking compound having in the molecule (a) one or more functional groups of the formula [3]:

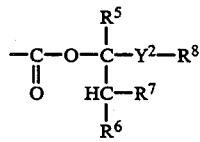
[3]

wherein $R^5$, $R^6$ and $R^7$ are respectively selected from the group consisting of a hydrogen atom and an organic group of 1 to 18 carbon atoms, $R^8$ is an organic group of 1 to 18 carbon atoms, $Y^2$ is selected from the group consisting of an oxygen atom and a sulfur atom and $R^7$ and $R^8$ may be bonded with each other to form a heterocyclic structure which comprises $Y^2$ as the hetero atom component; and (b) one or more reactive functional groups which can form chemical bonds with the functional groups (a) by heating; essentially, (E) a compound of the formula [2]:

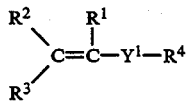
[2]

wherein $R^1$, $R^2$, $R^3$, $R^4$ and $Y^1$ have the same meaning as in the compound (A); optionally, (C) a thermal latent acid catalyst which is activated during curing of the composition by heating; and, optionally, the compound (A) described above and/or (B) a compound having in the molecule two or more reactive functional groups which can form chemical bonds by heating with either one or both of the functional group of the formula [3] and the functional group of the formula [1].

The thermosetting composition of the invention also comprise: essentially, (A) a compound having in the molecule two or more functional groups of the formula [1]:

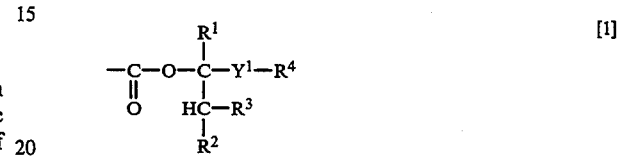
[1]

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hetero atom component; essentially, (B) a compound having in the molecule two or more reactive functional groups which can form chemical bonds with the functional groups of the compound (A) by heating; and essentially, (F) at least one thermal latent acid catalyst selected from the group consisting of a complex compound made from a Lewis acid and a Bronsted acid and a complex compound made from a Lewis acid and a Bronsted salt.

The thermosetting composition of the invention also comprise: essentially, (D) a self-crosslinking compound having in the molecule (a) one or more functional groups of the formula [3]:

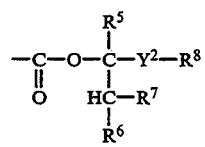
[3]

wherein $R^5$, $R^6$ and $R^7$ are respectively selected from the group consisting of a hydrogen atom and an organic group of 1 to 18 carbon atoms, $R^8$ is an organic group of 1 to 18 carbon atoms, $Y^2$ is selected from the group consisting of an oxygen atom and a sulfur atom and $R^7$ and $R^8$ may be bonded with each other to form a heterocyclic structure which comprises $Y^2$ as the hetero atom component; and (b) one or more reactive functional groups which can form chemical bonds with the functional groups (a) by heating; essentially, (F) at least one thermal latent acid catalyst selected from the group consisting of a complex compound made from a Lewis acid and a Bronsted acid and a complex compound made from a Lewis acid and a Bronsted salt; and, optionally, the compound (A) described above and/or (B) a compound having in the molecule two or more reactive functional groups which can form chemical bonds by heating with either one or both of the functional group of the formula [3] and the functional group of the formula [1].

The thermosetting composition of the invention also comprise: essentially, (A) a compound having in the molecule two or more functional groups of the formula [1]:

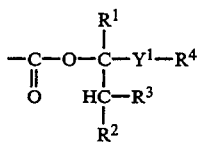

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hereto atom component; essentially, (G) a compound having two or more oxazoline groups in the molecule; and, optionally, (C) a thermal latent acid catalyst which is activated during curing of the composition by heating.

The thermal latent acid catalysts of the invention comprise a complex compound made from at least one compound selected from Lewis acids and at least one compound selected from Bronsted salts. The thermal latent acid catalysts of the invention also comprise a complex compound made from at least one compound selected from Lewis acids and at least one compound selected from Bronsted acids.

The articles of the invention are coated by the methods of coating of the invention described above.

Other and further objects, features and advantages of the invention will appear more fully from the following description.

DETAILED DESCRIPTION OF THE INVENTION

The invention will be explained in detail in the following.

The compound (A) in the thermosetting composition of the invention has in the molecule two or more, preferably from 2 to 50, functional groups of the following formula [1]:

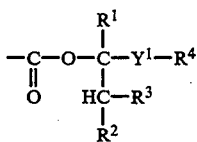

wherein $R^1$, $R^2$, $R^3$, $R^4$ and $Y^1$ have the same meaning as described above. The functional group having the formula [1] is easily prepared by reaction of carboxyl group with a vinyl ether, a vinyl thioether or a heterocyclic compound having oxygen or sulfur as the hetero atom and having a vinyl type double bond which is described by the formula [2]:

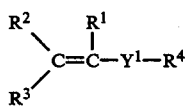

wherein $R^1$, $R^2$, $R^3$, $R^4$ and $Y^1$ have the same meaning as described above.

In the formula [1] and formula [2], $R^1$, $R^2$ and $R^3$ are respectively selected from the group consisting of a hydrogen atom and an organic group, such as alkyl group, aryl group and alkaryl group of 1 to 18 carbon atoms, $R^4$ is an organic group, such as alkyl group, aryl group and alkaryl group of 1 to 18 carbon atoms. The organic groups may have substituted groups in the molecule and $R^3$ and $R^4$ may, by bonding together, form a heterocyclic structure with or without substituents and having $Y^1$ as the hetero atom component.

Examples of the compound of the formula [2] are: aliphatic vinyl ethers, such as methyl vinyl ether, ethyl vinyl ether, isopropyl vinyl ether, n-propyl vinyl ether, n-butyl vinyl ether, isobutyl vinyl ether, 2-ethylhexyl vinyl ether, cyclohexyl vinyl ether and the like; aliphatic vinyl thioethers, such as methyl vinyl thioether, ethyl vinyl thioether, isopropyl vinyl thioether, n-propyl vinyl thioether, n-butyl vinyl thioether, isobutyl vinyl thioether, 2-ethylhexyl vinyl thioether, cyclohexyl vinyl thioether and the like; cyclic vinyl ethers, such as 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyran-2-one, 3,4-dihydro-2-ethoxy-2H-pyran, sodium 3,4-dihydro-2H-pyran-2-carboxylate and the like; and cyclic vinyl thioethers, such as 2,3-dihydrothiophene, 3,4-dihydrothiophene, 2,3-dihydro-2H-thiopyran, 3,4-dihydro-2H-thiopyran, 3,4-dihydro-2-methoxy-2H-thiopyran, 3,4-dihydro-4,4-dimethyl-2H-thiopyran-2-one, 3,4-dihydro-2-ethoxy-2H-thiopyran, sodium 3,4-dihydro-2H-thiopyran-2-carboxylate and the like.

The compound (A) is prepared by the reaction of a compound having two or more, preferably 2 to 50, carboxyl groups in the molecule with the compound having the formula [2]. Examples of the compound having two or more carboxyl groups in the molecule are: aliphatic polycarboxylic acids of 2 to 22 carbon atoms, such as succinic acid, adipic acid, azelaic acid, sebacic acid, decamethylenedicarboxylic acid and the like; aromatic polycarboxylic acids, such as phthalic acid, isophthalic acid, terephthalic acid, trimellitic acid, pyromellitic acid and the like; alicyclic polycarboxylic acids, such as tetrahydrophthalic acid, hexahydrophthalic acid, methylhexahydrophthalic acid and the like; resins having two or more carboxyl groups in the molecule, such as polyester resins, acrylic resins, polybutadiene resins modified with maleic acid and the like resins having two or more carboxyl groups in the molecule.

The compound having two or more carboxyl groups in the molecule is prepared by: (1) half-esterification of a polyol having two or more, preferably 2 to 50, hydroxyl groups in the molecule with an acid anhydride; (2) addition of a polyisocyanate compound having two or more, preferably 2 to 50 isocyanate groups in the molecule with a hydroxycarboxylic acid or an amino acid; (3) polymerization of an $\alpha,\beta$-unsaturated monomer having carboxyl group or copolymerization of the $\alpha,\beta$-unsaturated monomer with other $\alpha,\beta$-unsaturated monomers; (4) preparation of polyester resin having carboxyl groups and the like other methods.

Examples of the polyol having two or more hydroxyl groups are: ethylene glycol, 1,2-propylene glycol, 1,3-propylene glycol, 1,3-butanediol, 1,4-butanediol, 2,3-butanediol, 1,6-hexanediol, diethylene glycol, pentanediol, dimethylbutanediol, hydrogenated bisphenol A, glycerol, sorbitol, neopentyl glycol, 1,8-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, tris-hydroxyethyl isocyanurate, dipentaerythritol and the like; addition products of the polyhydric alcohol with a lactone, such as γ-butyrolactone and ε-caprolactone and the like, by ring opening of the lactone; addition products of the polyhydric alcohol with an isocyanate, such as tolylene diisocyanate, diphenylmethane diisocyanate, hexamethylene diisocyanate, isophorone diisocyanate and the like, in excess amount of the alcohol; addition products of the polyol with a divinyl ether, such as ethylene glycol divinyl ether, polyethylene glycol divinyl ether, butanediol divinyl ether, pentanediol divinyl ether, hexanediol divinyl ether, 1,4-cyclohexanedimethanol divinyl ether and the like, in excess amount of the alcohol; addition products of the polyol with an alkoxysilane compound, such as KR-213 ®, KR-217 ®, KR-9218 ® (products of Shinetsu Chemical Co., Ltd.), in excess amount of the alcohol; and the like other compounds.

Examples of the acid anhydride which reacts with the polyol having two or more hydroxyl groups in the molecule are: acid anhydrides of polycarboxylic acids, such as succinic acid, glutaric acid, adipic acid, azelaic acid, sebacic acid, decamethylenedicarboxylic acid, phthalic acid, maleic acid, trimellitic acid, pyromellitic acid, tetrahydrophthalic acid, hexahydrophthalic acid and the like.

Examples of the polyisocyanate compound having two or more isocyanate groups in the molecule are: p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane- 1,6-diisocyanate, methylene-bis-(phenyl isocyanate), lysine methyl ester diisocyanate, bis-(isocyanatoethyl) fumarate, isophorone diisocyanate, methylcyclohexyl diisocyanate, 2-isocyanatoethyl-2,6-diisocyanatohexanoate, biuret derivatives of these polyisocyanates, isocyanurate derivatives of these polyisocyanates and the like compounds.

Examples of the hydroxycarboxylic acid which reacts with the polyisocyanate compound are: lactic acid, citric acid, hydroxypivalic acid, 12-hydroxystearic acid, malic acid and the like. Examples of the amino acid which reacts with the polyisocyanate compound are: DL-alanine, L-glutamic acid, glycine, L-teanine, glycylglycine, aminocaproic acid, L-aspartic acid, L-citrulline, L-arginine, L-leucine, L-serine and the like.

Examples of the α,β-unsaturated monomer having carboxyl group which are polymerized or copolymerized are: acrylic acid, methacrylic acid, itaconic acid, mesaconic acid, maleic acid, fumaric acid and the like. Examples of the other α,β-unsaturated monomer which is copolymerized with the α,β-unsaturated monomer having carboxyl group are: methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, cyclohexyl (meth)acrylate, 2-ethylhexyl (meth)acrylate, stearyl (meth)acrylate, styrene, α-methylstyrene, p-vinyltoluene, acrylonitrile and the like.

The polyester resin having carboxyl groups is easily prepared according to the conventional method of preparation of polyester resins by using excess amount of polyacid in relation to the amount of polyol.

The reaction of the compound having two or more carboxyl group in the molecule with the compound having the formula [2] is generally performed at a temperature between the ambient temperature and 100° C. in the presence of an acid catalyst.

Either a single kind of the compound (A) or a combination of two or more kinds of the compound (A) may be utilized in the invention.

The compounds (B) utilized in the thermosetting composition of the invention are compounds having in the molecule two or more, preferably from 2 to 50, reactive functional groups which can form chemical bonds by the reaction with the regenerated carboxyl group formed from the blocked carboxyl group [1] of the compound (A) by heating. The kind of the reactive functional group is not particularly limited so long as it satisfies the condition described above. Preferable examples of the reactive functional group are: epoxy group, oxazoline group, silanol group, alkoxysilane group, hydroxyl group, amino group, imino group, isocyanate group, blocked isocyanate group, cyclocarbonate group, vinyl ether group, vinyl thioether group, aminomethylol group, alkyl substituted aminomethylol group, acetal group, ketal group and the like groups. The compound (B) may have either a single kind or two or more kinds of the reactive functional groups in the molecule.

Examples of the compound of (B) are: compounds having epoxy group, such as epoxy resins of bisphenol type, alicyclic epoxy resins, homopolymers and copolymers of glycidyl (meth)acrylate, 3,4-epoxycyclohexylmethyl (meth)acrylate and the like compounds, polyglycidyl compounds obtained by the reaction of epichlorohydrine with polycarboxylic acids or polyols and other like compounds; compounds having oxazoline group, such as oxazoline compounds having an oxazoline ring connected to an alkyl chain like 1,2-bis(2-oxazolinyl-2)ethane, 1,4-bis(2-oxazolinyl-2)butane, 1,6-bis(2-oxazolinyl-2)hexane, 1,8-bis(2-oxazolinyl-2)octane, 1,4-bis(2-oxazolinyl-2)cyclohexane and the like, oxazoline compounds having two oxazoline rings connected to an aromatic ring like benzene ring like 1,2-bis(2-oxazolinyl-2)benzene, 1,3-bis(2-oxazolinyl-2)benzene, 1,4-bis(2-oxazolinyl-2)benzene, 5,5'-dimethyl-2,2'-bis(2-oxazolinyl-2)benzene, 4,4,4',4'-tetramethyl-2,2'-bis(2-oxazolinyl-2)benzene, 1,2-bis(5-methyl-2-oxazolinyl-2)benzene, 1,4-bis(5-methyl-2-oxazolinyl-2)benzene and the like. bis-(2-oxazoline) compounds like 2,2'-bis(2-oxazoline), 2,2'-bis(4-methyl-2-oxazoline), 2,2'-bis(5-methyl-2-oxazoline) and the like, polyfunctional oxazoline compounds obtained by the reaction of hydroxyalkyl-2-oxazoline with the polyisocyanate compounds described above, compounds comprising oxazoline group like polymers and copolymers of 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline and the like, commercial compounds comprising oxazoline group like CX-RS-1200 ®, CX-RS-3200 ® (products of Nippon Shokubai Co., Ltd.) and the like other compounds having oxazoline group; compounds having silanol group or alkoxysilane group, such as condensation products of a compound having the formula [4]:

$$(R^{10})_n Si(OR^{11})_{4-n} \quad [4]$$

wherein $R^{10}$ and $R^{11}$ are respectively selected from the group consisting of alkyl group of 1 to 18 carbon atoms and aryl group of 1 to 18 carbon atoms and n is 0, 1 or 2, homopolymers and copolymers of α,β-unsaturated silane compounds, like acryloyloxypropyltrimethoxysilane, methacryloyloxypropyltrimethoxysilane, methacryoyloxy-propyl-tri-n-butoxysilane and the like, hydrolysis products of these compounds and the like; compounds having hydroxyl group, such as aliphatic polyols, phenols, polyalkyleneoxyglycols, homopolymers and copolymers of α,β-unsaturated compounds, like 2-hydroxyethyl-(meth)acrylates, 2-hydroxypropyl (meth)acrylate and the like, addition products of ε-caprolactone with these polyhydroxyl compounds and the like; compounds having amino group, such as aliphatic diamino compounds, aromatic diamino compounds, polyamino compounds prepared by cyanoethylation and reduction of the compounds having hydroxyl group and the like; compounds having imino group, such as aliphatic polyimino compounds, aromatic polyimino compounds and the like; compounds having isocyanate group, such as p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene-bis-(phenyl isocyanate), lysine methyl ester diisocyanate, bis-(isocyanatoethyl) fumarate, isophorone diisocyanate, methylcylcohexyl diisocyanate, 2-isocyanatoethyl 2,6-diisocyanatohexanoate, biuret derivatives and isocyanurate derivatives of these isocyanates, addition products of these isocyanates and the compounds having hydroxyl group and the like; compounds having blocked isocyanate group, such as compounds prepared by blocking the compounds having isocyanate group with phenols, lactams, active methylenes, alcohols, acid amides, imides, amines, imidazoles, ureas, imines, or oximes and the like compounds; compounds having cyclocarbonate group, such as homopolymers and copolymers of 3-(meth)acryloyloxypropylene carbonate, compounds having polyfunctional cyclocarbonate groups prepared by the reaction of the compounds having epoxy group with carbon dioxide and the like; compounds having vinyl ether group or vinyl thioether group, such as polyfunctional vinyl ether compounds prepared by the reaction of the compounds having hydroxyl group with halogenated alkyl vinyl ethers, polyvinyl ethers prepared by the reaction of hydroxyalkyl vinyl ethers with compounds having polyfunctional carboxyl group or with the compounds having isocyanate group, copolymer of vinyloxyalkyl (meth)acrylates with α,β-unsaturated compounds, vinyl thioethers corresponding to the vinyl ethers and the like; compounds having aminomethylol groups or alkyl substituted aminomethylol groups, such as melamine formaldehyde resins, glycolyl formaldehyde resins, urea formaldehyde resins, homopolymers and copolymers of α,β-unsaturated compounds having aminomethylol group or alkylated aminomethylol group and the like; compounds having acetal groups or ketal groups, such as polyfunctional acetal compounds prepared by the reaction of polyfunctional ketones, polyfunctional aldehydes, or polyfunctional vinyl ether compounds and the like compounds with alcohols or orthoacids esters, condensation products of the polyfunctional acetal compounds with polyols, homopolymers and copolymers of addition products of the vinyloxyalkyl (meth)acrylate with alcohols or orthoacid esters; and the like other compounds.

The compound (B) utilized in the invention may be either a compound comprising a single kind of functional group, such as the compounds shown in the examples, or a compound comprising two or more kinds of functional group in the molecule. Two or more kinds of the compound (B) may utilized together. However, when the functional groups of two or more kinds are reactive between each other, the storage stability of the thermosetting composition is damaged and the utilization of such combination of the functional groups is undesirable. Examples of such undesirable combination of functional groups are: combination of a functional group selected from the group of epoxy group, isocyanate group, vinyl ether group, vinyl thioether group, cyclocarbonate group and silanol group with amino group or imino group, combination of hydroxyl group with isocyanate group or vinyl ether group and the like other combinations.

The thermosetting composition of the invention may comprise the compound (A) and the compound (B) or it may comprise compound (D), a self-crosslinking compound comprising (a) one or more, preferably from 1 to 50, functional groups having the formula [3]:

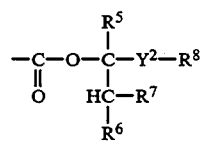

wherein $R^5$, $R^6$, $R^7$, $R^8$ and $Y^2$ have the same meaning as described above, and (b) one or more, preferably from 1 to 50, reactive functional groups which can form chemical bond with the functional group (a) by heating. The thermosetting composition of the invention may also comprise the compound (D) and the compound (A) and/or the compound (B) and, in this case, the functional group of the compound (B) forms chemical bond with the functional group of formula [1] and/or the functional group of formula [3] by heating.

Examples of the functional group (a) having the formula [3] of the compound (D) are the same functional groups as the examples of the functional group having the formula [1] in the compound (A) already described. Examples of the reactive functional group (b) are the same functional groups as the examples of the reactive functional groups of compound (B).

The compound (D) can be prepared from a compound comprising one or more, preferably from 1 to 50, carboxyl groups and one or more, preferably from 1 to 50, reactive functional groups in the molecule by using the same reaction as the reaction utilized in the preparation of the compound (A). The compound (D) can also be prepared by copolymerization of an unsaturated compound having the functional group of formula [3] with an unsaturated compound having the reactive functional group.

The compound (D) comprises the functional group of formula [3] and, furthermore, may comprise two or more kinds of the reactive functional groups in the same molecule. However, when the two or more kinds of the functional groups are reactive between each other, the storage stability of the thermosetting composition is damaged and the utilization of such combination of the functional groups is undesirable.

As (G) a compound comprising two or more oxazoline groups in the molecule utilized in the thermosetting composition of the invention, the compounds having oxazoline group described above can be utilized.

The compound (G) provides the thermosetting composition with excellent low temperature curing property and excellent hardness of the coating.

In the thermosetting composition of the invention, it is preferable that at least one of the compounds (A) and/or the compound (B), at least one of the compound (D) and the compound (A) and/or the compound (B) which are utilized optionally or at least one of the compound (A) and/or (G) is a polymer of α,β-unsaturated compound or a polyester resin. It is also preferable that equivalent ratio of the functional group of the formula [1] or the formula [3] and the reactive functional group to form chemical bond with the former functional group by heating utilized in the thermosetting composition is adjusted in the range from 0.2:1.0 to 1.0:0.2.

The functional groups having the formula [1] and the formula [3] in the compound (A) and the compound (D) of the invention regenerate free carboxyl group by heating and form chemical linkages with the reactive functional groups in the compound (B), the compound (D) and the compound (G). They can also react with the functional groups in the compound (B), the compound (D) and the compound (G) by addition between the functional groups and this addition reactions can contribute to decreasing amount of volatile organic substances discharged into air because the addition reactions are not accompanied with elimination reactions during the crosslinking.

The compound (E) having the formula [2] utilized in the thermosetting composition of the invention blocks again the free carboxyl group which has been formed by hydrolysis of the blocked carboxyl group in the compounds described above when water is present in the thermosetting composition and enhances the storage stability. The hydrolysis tends to take place particularly when the content of water in the thermosetting composition is 0.1 weight % or more and it is particularly effective in this condition that the compound (E) is comprised in the composition.

As the compound having the formula [2] described above which is utilized as the compound (E), a vinyl ether or a vinyl thioether of the same kind as that utilized for blocking the carboxyl group described above can be utilized. Examples of such a compound having the formula [2] are: aliphatic vinyl ethers, such as methyl vinyl ether, ethyl vinyl ether, isopropyl vinyl ether, n-propyl vinyl ether, n-butyl vinyl ether, isobutyl vinyl ether, 2-ethylhexyl vinyl ether, cyclohexyl vinyl ether and the like; aliphatic vinyl thioethers corresponding to the aliphatic vinyl ethers; cyclic vinyl ethers, such as 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyran-2-one, 3,4-dihydro-2-ethoxy-2H-pyran, sodium 3,4-dihydro-2H-pyran-2 carboxylate and the like; cyclic vinyl thioethers corresponding to the cyclic vinyl ethers and the like compounds. Preferable examples among them are ethyl vinyl ether, isopropyl vinyl ether, n-propyl vinyl ether, n-butyl vinyl ether and isobutyl vinyl ether.

The amount of the compound (E) utilized in the thermosetting composition of the invention is preferably in the range from 0.1 to 20 weight % and more preferably in the range from 1 to 10 weight % based on the total amount of the thermosetting composition. When the amount is less than 0.1 weight %, the effect to improve the storage stability is sometimes insufficient and, when the amount is more than 20 weight %, the solid content of the thermosetting composition is decreased. Thus, amounts outside of the specified range are not advantageous.

In the present invention, the thermal latent acid catalyst (C) which shows activity in the curing condition at an elevated temperature may be optionally comprised in the thermosetting composition for the purpose of keeping excellent storage stability of the composition for a long period of time, promoting the curing reaction when the composition is cured in a short time at a rather low temperature and giving excellent chemical properties and physical properties to the cured products. It is preferable that the thermal latent acid catalyst is a compound which exhibit the activity at the temperature above 60° C. If the thermal latent acid catalyst shows the catalytic activity under 60° C., the prepared thermosetting composition has undesirable properties, such as increase of viscosity during storage and formation of gel.

Preferred examples of the thermal latent acid catalyst (C) are compounds prepared by neutralizing Bronsted acids or Lewis acids with Lewis bases, complex compounds formed from Lewis acids and Bronsted acids, complex compounds formed from Lewis acids and Bronsted salts, esters of sulfonic acids, esters of phosphoric acid and onium compounds.

The Bronsted acid forming the thermal latent acid catalyst is a substance showing acidity with dissociation of proton and preferably sulfuric acid, sulfonic acid, phosphoric acid, boric add, carboxylic acids and derivatives thereof.

Examples of the Bronsted acid are sulfuric acid, monoesters of sulfuric acid, phosphoric acid, monoesters and diesters of phosphoric acid, esters of polyphosphoric acid, monoesters and diesters of boric acid, sulfonic acids, carboxylic acids, halogenocarboxylic acids and the like and, preferably, alkylbenzenesulfonic acids having 1 to 50 carbon atoms, such as dodecylbenzenesulfonic acid and the like, mono- or dihalogenocarboxylic acids, such as chloroacetic acid, dichloroacetic acid and the like, alkyl monoesters and diesters of phosphoric acid having 1 to 50 carbon atoms, such as monomethyl phosphate, dimethyl phosphate and the like, and the like compounds. The Bronsted acid may be utilized singly or as a combination of two or more kinds.

The Lewis acid forming the thermal latent acid catalyst is a compound having the property of accepting electrons and preferably a metal halide or a organometallic compound having the formula:

wherein $R^9$ is a halogen atom or one or more kinds of organic groups selected from the group consisting of alkyl groups, aryl groups, alkoxy groups and acyloxy groups of 1 to 20 carbon atoms and a carbonyl group adjacent to an active methylene group, M is B, Mg, Al, Ca, Sn, Pb or a transition metal atom belonging to one of the 3A group to the 7A group, the 8 group, the 1B group and the 2B group in the fourth to the sixth period of the long Periodic Table and n is an integer in the range from 1 to 6.

The metals forming the Lewis acid in the long Periodic Table described above are classified according to the method of nomenclature of inorganic chemistry by IUPAC in 1988.

Examples of the Lewis acid are: metal halides, such as boron trifluoride, aluminum trichloride, titanium trichloride, titanium tetrachloride, ferrous chloride, ferric chloride, zinc chloride, zinc bromide, stannous chloride, stannic chloride, stannous bromide, stannic bromide and the like, organometallic compounds, such as trialkylboron, trialkylaluminum, dialkylaluminum halides, monoalkylaluminum halides, tetraalkyltin, aluminum actylacetonate, iron acetylacetonate, zirconium acetylacetonate, dibutyltin acetylacetonate, dibutyltin dilaurate, dioctyltin ester maleate, magnesium naphthenate, calcium naphthenate, manganese naphthenate, iron naphthenate, cobalt naphthenate, copper naphthenate, zinc naphthenate, zirconium naphthenate, lead naphthenate, calcium octanoate, manganese octanoate, iron octanoate, cobalt octanoate, zinc octanoate, zirconium octanoate, tin octanoate, lead octanoate, zinc laurate, magnesium stearate, aluminum stearate, calcium stearate, cobalt stearate, zinc stearate, lead stearate and the like, and other like compounds. The Lewis acid may be utilized singly or as a combination of two or more kinds.

The Lewis base utilized for neutralizing the Bronsted acid or the Lewis acid is a compound having the property of donating electrons. Examples of the Lewis base are: amines, such as ammonia, triethylamine, pyridine, aniline, morpholine, N-methylmorpholine, pyrrolidine, N-methylpyrrolidine, piperidine, N-methylpiperidine, cyclohexylamine, n-butylamine, dimethyloxazoline, imidazole, N-methylimidazole, N,N-dimethylethanolamine, N,N-diethylethanolamine, N,N-dipropylethanolamine, N,N-dibutylethanolamine, N,N-dimethylisopropanolamine, N,N-diethylisopropanolamine, N,N-dipropylisopropanolamine, N,N-dibutylisopropanolamine, N-methyldiethanolamine, N-ethyldiethanolamine, N-propyldiethanolamine, N-butyldiethanolamine, N-methyldiisopropanolamine, N-ethyldiisopropanolamine, N-propyldiisopropanolamine, N-butyldiisopropanolamine, triethanolamine, triisopropanolamine, tri-s-butanolamine and the like; amides, such as N,N-dimethylformamide, N,N-dimethylacetamide, N-methylpyrrolidone, hexamethylphosphoric acid triamide and the like; sulfoxide compounds, such as dimethylsulfoxide and the like; ethers, such as diethylether, tetrahydrofuran and the like; thioethers, such as dimethylsulfide and the like; esters of phosphoric acid, such as trimethyl phosphate, triethylphosphate, tributyl phosphate and the like; esters of boric acid, such as trimethyl borate and the like; esters of carboxylic acids, such as ethyl acetate, butyl acetate and the like; esters of carbonic acid, such as ethylene carbonate and the like; trialkylphosphines, such as tributylphosphine and the like; and like other compounds.

In the thermal latent acid catalyst obtained by neutralizing the Bronsted acid or the Lewis acid With the Lewis base, the ratio of the basic activity of the Lewis base to the acidic activity of the acid is preferably in the range from 0.1 to 10. When the ratio is less than 0.1, the catalytic activity of the acid may not be sufficiently suppressed during storage and, when the ratio is more than 10, the catalytic activity of the acid tends to be decreased. Thus, ratios outside of the specified range are not advantageous.

The esters of sulfonic acids utilized as (C) the thermal latent acid catalyst are compounds having the formula [4]:

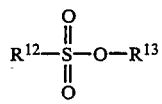
[4]

wherein $R^{12}$ is selected from the group consisting of phenyl group, substituted phenyl group, naphthyl group, substituted naphthyl group and alkyl group and $R^{13}$ is a group of 3 to 18 carbon atoms bonded with sulfonyloxy group through a primary or secondary carbon atom which is selected from the group consisting of alkyl group, alkenyl group, aryl group, alkaryl group, alkanol group, saturated or unsaturated cycloalkyl group and saturated or unsaturated hydroxycycloalkyl group. Examples of the above compounds are esters of sulfonic acids, such as methane sulfonic acid, ethane sulfonic acid, benzene sulfonic acid, dodecylbenzene sulfonic acid, naphthalene sulfonic acid, nonylnaphthalene sulfonic acid and other like sulfonic acids, with primary alcohols, such as n-propanol, n-butanol, n-hexanol, n-octanol and the like, or secondary alcohols, such as isopropanol, 2-butanol, 2-hexanol, 2-octanol, cyclohexanol and the like, and $\beta$-hydroxyalkylsulfonic esters prepared by the reaction of the sulfonic acids and compounds containing oxirane group.

The esters of phosphoric acid are, for example, compounds having the formula [5]:

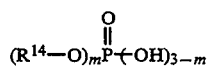
[5]

wherein $R^{14}$ is a group of 3 to 10 carbon atoms selected from the group consisting of alkyl group, cycloalkyl group and aryl group and m is 1 or 2. Examples of the above compounds are monoesters and diesters of phosphoric acid with primary alcohols, such as n-propanol, n-butanol, n-hexanol, n-octanol, 2-ethylhexanol and the like, or secondary alcohols, such as isopropanol, 2-butanol, 2-hexanol, 2-octanol, cyclohexanol and the like, and $\beta$-hydroxyester compounds obtained by reaction of phosphoric acid with oxirane compounds.

The onium compounds are compounds having one of the formulas [6] to [9]:

[6]

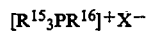
[7]

[8]

and

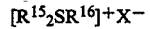
[9]

wherein $R^{15}$ is a group of 1 to 12 carbon atoms selected from the group consisting of alkyl group, alkenyl group, aryl group, alkaryl group, alkanol group and cycloalkyl group, two $R^{15}$ groups may be bonded together to form a heterocyclic ring in which N, P, O or S is the hetero atom, $R^{16}$ is a hydrogen atom or a group of 1 to 12 carbon atoms selected from the group consisting of alkyl group, alkenyl group, aryl group and alkaryl group and $X-$ is selected from the group consisting of $SbF_6^-$, $AsF_6^-$, $PF_6^-$ and $BF_4^-$.

Among the thermal latent acid catalysts (C) utilized in the thermosetting composition of the invention, (F) the thermal latent acid catalyst selected from the group consisting of a complex compound made from a Lewis acid and a Bronsted acid and a complex compound made from a Lewis acid and a Bronsted salt is a novel thermal latent acid catalyst particularly effective for the thermosetting composition of the invention and the complex compound made from a Lewis acid and a Bronsted acid is most excellent thermal latent acid catalyst.

The complex compound (F) is superior to other thermal latent acid catalysts with respect to the storage stability, the reactivity of the heat curing and the property of the low temperature curing.

The Bronsted salt utilized for forming the complex compound (F) is a compound obtained by neutralizing the Bronsted acid described above with a base. Examples of the Bronsted salt are: compounds obtained by blocking Bronsted acids, such as sulfuric add, monoesters of sulfuric acid, phosphoric acid, monoesters and diesters of phosphoric acid, esters of polyphosphoric acid, monoesters and diesters of boric acid, sulfonic acid, carboxylic add, hologenocarboxylic acid and the like, with amines, such as ammonia, triethylamine, pyridine, aniline, morpholine, N-methylmorpholine, pyrrolidine, N-methylpyrrolidine, piperidine, N-methylpiperidine, cyclohexylamine, n-butylamine, diethanolamine, triethanolamine, imidazole, N-methylimidazole and the like, trialkylphosphines, such as tributylphosphine or the like, triarylphosphines, such as triphenylphosphine and the like; commercial acid-base blocked catalysts, such as Nacure 2500X ®, Nacure 3525 ® and Nacure 5225 ® (products of King Industry Co., Ltd.); and other like compounds.

The novel thermal latent acid catalyst (F) is a complex compound formed by coordination of the conjugate base of the Brønsted acid or the Bronsted salt to the vacant orbital of the Lewis acid showing the catalytic activity and can be obtained easily by mixing the Lewis acid described above with the Brønsted acid described above or with the Bronsted salt described above in a mol ratio of the Brønsted acid or the Bronsted salt to the vacant orbital of the Lewis acid in the range from 0.1 to 4. When the mol ratio is less than 0.1, the catalytic activity of the Lewis acid is not always sufficiently suppressed during storage and, when the mol ratio is more than 4, the catalytic activity of the acid tends to be decreased.

In the thermosetting composition of the invention, the thermal latent acid catalysts (C) and (F) may be utilized singly or as a combination of two or more kinds. The amount utilized is usually in the range from 0.01 to 10 weight parts, preferably in the range from 0.02 to 5 weight parts, based on 100 weight parts of the total solid component which is the sum of the compound (A) and the compound (B), the sum of the compound (D) and the optionally utilized compounds (A) and/or (B) or the sum of the compound (A) and the compound (G).

Time and temperature required to cure the thermosetting composition of the invention is different depending on the temperature at which free carboxyl group is regenerated from the blocked functional group of the formula [1] or the formula [3], kind of the reactive functional group and the kind of the thermal latent acid catalyst. In general, curing is completed by heating at the temperature in the range from 50° to 200° C. for the time in the range from 2 minutes to 10 hours. The thermosetting composition of the invention has an advantageous property that it can be cured at a temperature below 160° C. and higher temperatures are not necessarily required.

The thermosetting composition of the invention can be utilized for coating compositions, ink, adhesive, molded plastics and the like without other ingredients and, according to the needs, it may be compounded with coloring pigments, fillers, solvents, ultraviolet adsorbents, antioxidants and other ingredients.

When the thermosetting composition of the invention is utilized as the top coating material, it is realized by this method of coating that little amount of organic solvents is discharged into air and excellent appearance is provided to the finished articles and the method can be advantageously applied to the field of industrial coating such as coating of automobiles.

When the thermosetting composition is utilized as the top coating material, it is preferred that the top coating material comprises 0 to 100 weight parts, preferably 0 to 5 weight parts, of pigments based on 100 weight parts of the thermosetting composition.

When the thermosetting composition of the invention is utilized for preparing articles coated with plural of layers comprising a colored base coat and a clear coat, articles having very excellent finished appearance can be obtained.

The base coat is made of a film forming composition comprising a resin binder and pigments. As the resin binder, conventional acrylic polymers, polyesters including alkyd resins, polyurethanes and the like may be utilized as well as the thermosetting composition of the invention.

As the pigments comprised in the film forming composition for the base coat, surface treated metallic pigments such as aluminum, copper, brass, bronze, stainless steel, iron oxides of mica form, metallic powders of flake form, mica coated with titanium oxide or iron oxide and the like may be utilized. Inorganic pigments, such as titanium dioxide, iron oxides, yellow iron oxide, carbon black and the like, organic pigments, such as phthalocyanine blue, phthalocyanine green, quinacridone red pigments and the like, fillers, such as precipitated barium sulfate, clay, silica, tarc and the like, and other like pigments may also be utilized.

Conventionally utilized additives of various kinds, such as surface active agents, levelling agents, rheology control agents, fillers, defoaming agents, organic cosolvents, catalysts and the like, may be added to the film forming composition for the base coat.

Kind of the substrate to which the base coat is applied is not particularly limited but various kinds of substrate materials, such as woods, glasses, metals, fabrics, plastics, foamed articles, elastomers and the like, may be utilized.

Thickness of the base coat is not particularly limited but is generally in the range from 5 to 40 μm and preferably in the range from 10 to 30 μm.

The layer of the base coat is formed by application of the film forming composition for the base coat to the substrate, followed by removal of organic solvent or water used as the solvent from the coating layer by heating or by simply standing.

The film forming composition for the clear coat is applied to the base coat formed in the above. The film forming composition for the clear coat is the themosetting composition of the invention.

Pigments, additives of various kinds, dyestuffs having good weatherability and the like may be added to the film forming composition for the clear coat according to necessity within the range that the additional ingredients do not affect adversely to the transparency of the clear coat.

Thickness of the clear coat is not particularly limited but generally in the range from 20 to 100 μm and preferably in the range from 20 to 50 μm.

As the method of application of the film forming composition for the base coat and the film forming composition for the clear coat, generally utilized methods, such as coating by brushes, spray coating, dip coating, flow coating and the like, may be utilized. The preferable method among them is spray coating.

When the film forming composition for the base coat and the film forming composition for the clear coat have been applied to the substrate, the article is left standing for 1 to 20 minutes at the room temperature and then baked for 2 minutes to 10 hours at 50° to 200° C. to obtain the coated article of the invention.

DESCRIPTION OF THE PREFERRED EMBODIMENTS

The invention will be understood more readily with reference to the following examples; however, these examples are intended to illustrate the invention and are not to be construed to limit the scope of the invention.

Properties of the coated film were evaluated by the following methods.

(1) Acid Resistance 1

On a test piece, 2 ml of 40 weight % sulfuric acid was applied as spots and condition of the coated film was observed by visual comparison after standing for 48 hour at 20° C.

(2) Acid Resistance 2

On a test piece, 2 ml of 40 weight % sulfuric acid was applied as spots and condition of the coated film was observed by visual comparison after heating for 30 minutes at 60° C.

(3) Acid Resistance 3

A test piece was dipped in 0.1N sulfuric acid and the condition of coated film was observed by visual comparison after standing for 24 hours at 60° C.

(4) Impact Resistance

By using an impact tester (Japanese Industrial Standard K-5400 (1990), 8.3.2, Du Pont method), a test piece was clamped to an impact frame of 6.35 mm radius and a weight of 500 g was dropped from the height of 40 cm on the test piece. Damage made on the coating film was observed by visual comparison.

(5) Weathering Resistance

By using a sunshine weathermeter (Japanese Industrial Standard K-5400 (1990) 9.8.1), a test piece was exposed for 1000 hours or 3000 hours and 60 degree specular gloss (Japanese Industrial Standard K-5400 (1990) 7.6 60 degree specular gloss) of the coating film was measured. Condition of the coating film was observed by visual comparison or compared with the condition before the exposure by using the measured values of gloss.

(6) Knoop Hardness

Measurement was made by using M type micro-hardnessmeter (manufactured by Shimazu Seisakusho, Co., Ltd.) at 20° C. A larger value shows a higher hardness.

(7) Non-volatile Matter

Non-volatile matter was measured by treating the sample in vacuo of 0.1 mmHg at 50° C. for 3 hours.

(8) Gardener Viscosity

Gardener viscosity was measured by the method of Japanese Industrial Standard K-5400 (1990) 4.5.1 (bubble tube viscometer).

Abbreviations and trade names used in the examples are listed in the following.

AIBN: 2,2'-azo-bis-isobutyronitrile

TMSPMA: methacryloyloxypropyltrimethoxysilane

10% N-methylmorpholine: 10 weight % solution of N-methylmorpholine in xylene

10% PTSA: 10 weight % solution of p-toluene sulfonic acid in isopropyl alcohol.

Acid catalyst A: a complex of zinc octanoate and triethylphosphate containing 12 weight % of zinc octanoate.

Acid catalyst B: 45 weight % solution in ethyl acetate of N-methylmorpholine salt of dodecylbenzenesulfonic acid.

Chemitite MZ-11 ®: a product of Nippon Shokubai Kagaku Kogyo Co., Ltd., 2-(1-aziridinyl)ethyl methacrylate Chemitite PZ-33 ®: a product of Nippon Shokubai Kagaku Kogyo Co., Ltd., polyaziridine, content of aziridine 6.2 mol/kg.

Coronate EH ®: a product of Nippon Polyurethane Kogyo Co., Ltd., trimer of hexamethylene diisocyanate, content of isocyanate 21 weight %.

CX-RS-1200 ®: a product of Nippon Shokubai Kagaku Kogyo Co., Ltd., a polyoxazoline compound, solid content 50%, glass transition temperature 10° C., weight average molecular weight 18000 and oxazoline equivalent molecular weight 555.

CX-RS-3200 ®: a product of Nippon Shokubai Kagaku Kogyo Co., Ltd., a polyoxazoline compound, solid content 50%, glass transition temperature 10° C., weight average molecular weight 14000 and oxazoline equivalent molecular weight 555.

Cymel 303 ®: a product of Mitsui Cyanamide Co., Ltd., methylated melamine resin, non-volatile matter 98 weight %.

Denacol EX-421 ®: a product of Nagase Kagaku Kogyo Co., Ltd., a polyepoxy compound, epoxy equivalent 155.

KR-214 ®: a product of Shinetsu Kagaku Kogyo Co., Ltd., silicone vanish, hydroxyl equivalent 490, non-volatile matter 70 weight %.

Modaflow ®: a product of Monsanto Co., a leveling agent.

Titanium dioxide JR-602 ®: a product of Teikoku Kako Co., Ltd., titanium dioxide of rutile type.

EXAMPLE OF PREPARATION OF MATERIAL 1 TO 3

Solutions of three kinds of the compound (A), A-1, A-2 and A-3, were prepared.

(1) Preparation of α,β-unsaturated Compound

A mixture shown in Table 1 was charged into a four-necked flask which is equipped with a thermometer, a reflux condenser and a stirrer and stirred at 50° C. The reaction was finished when the acid value of the mixture decreased to a value less than 30 and the reaction mixture was transferred to a separating funnel after cooling by standing. The reaction mixture was washed with 100 weight parts of alkaline water containing 10 weight % of sodium bicarbonate in a separation funnel and then washed with 200 weight parts of deionized water repeatedly until pH of the washing water became below 7. The organic layer was dried by adding Molecular Sieve 4A1/16 (a product of Wako Junyaku Co., Ltd.) and standing for 3 days at the room temperature. The α,β-unsaturated compounds obtained by this process, A-1(a), A-2(a) and A-3(a), contained effective components in the amounts shown in Table 1. The contents of the effective components were determined by gas chromatography.

(2) Preparation of Solution of Compounds A-1, A-2 and A-3

Into a four-necked flask equipped with a thermometer, a reflux condenser, a stirrer and a dropping funnel, an initial portion of solvent which was xylene was charged in an amount shown in Table 2, heated under stirring and kept at 80° C. A mixture of monomers and a polymerization initiator shown in Table 2 ('component of dropped mixture') was added by dropping to the solvent at 80° C. at a constant rate for 2 hours. When the addition of the dropping component was finished, the mixture was kept at 80° C. for further 1 hour and, then, an additional amount of initiator solution shown in Table 2 ('additional catalyst') was added to the mixture. The mixture was kept at 80° C. for 4 hours before finishing the reaction and finally the compounds A-1, A-2 and A-3 having the properties shown in Table 2 were obtained.

TABLE 1

| Example of preparation of material | 1 | 2 | 3 |
|---|---|---|---|
| α,β-unsaturate compound | A-1(a) | A-2(a) | A-3(a) |
| composition of material (weight part) | | | |
| methacrylic acid | 86.0 | 86.0 | 86.0 |
| ethyl vinyl ether | 86.5 | — | — |
| isobutyl vinyl ether | — | 120.2 | — |
| 3,4-dihydro-2H-pyran | — | — | 100.9 |
| hydroquinone monomethyl ether | 0.2 | 0.2 | 0.2 |
| 35 weight % hydrochloric acid | 0.1 | 0.1 | 0.1 |
| content of the effective component (weight %) | 94.5 | 95.3 | 95.1 |

TABLE 2

| Example of preparation of material | 1 | 2 | 3 |
|---|---|---|---|
| compound (A) | A-1 | A-2 | A-3 |
| xylene (weight part) | 200.0 | 200.0 | 200.0 |
| composition of dropped mixture (weight part) | | | |
| α,β-unsaturated compound A-1(a) | 167.2 | — | — |
| α,β-unsaturated compound A-2(a) | — | 195.2 | — |
| α,β-unsaturated compound A-3(a) | — | — | 178.8 |
| n-butyl methacrylate | 100.0 | 100.0 | 100.0 |
| methyl methacrylate | 178.6 | 178.6 | 178.6 |
| 2-ethylhexyl acrylate | 135.4 | 135.4 | 135.4 |
| n-butyl acetate | 135.9 | 106.8 | 123.8 |
| AIBN | 22.9 | 24.0 | 23.4 |
| additional catalyst (weight part) | | | |
| n-butyl acetate | 57.0 | 57.0 | 57.0 |
| AIBN | 3.0 | 3.0 | 3.0 |
| properties | | | |
| non-volatile matter (weight %) | 57.2 | 60.1 | 58.5 |
| Gardener viscosity (25° C.) | R-S | W-X | U |

EXAMPLE OF PREPARATION OF MATERIAL 4

Solution of one kind of the compound (A), A-4, was prepared.

(1) Preparation of Polycarboxylic Acid A-4(a)

Into a four-necked flask equipped with a thermometer, a reflux condenser, a stirrer and a dropping funnel, the following components were charged and the mixture was heated under stirring until the temperature reached to 120° C.

| pentaerythritol | 136.0 weight parts |
|---|---|
| methyl isobutyl ketone | 538.7 weight parts |

To the mixture kept at 120° C., 672.0 weight parts of methylhexahydrophthalic anhydride was added by dropping for 2 hours and the mixture was kept stirring under heating until acid value of the mixture decreased to a value not more than 170. The acid value was measured by diluting the sample 50 times by weight with a mixture of pyridine and water (pyridine/water 9/1 by weight), heating for 30 minutes at 90° C. and titrating with a standard solution of potassium hydroxide. Thus, a solution of a tetrafunctional polycarboxy compound A-4(a) was prepared.

(2) Preparation of Solution of Compound A-4

Into a flask of the same kind as the above, a mixture of the following composition including the solution of the polycarboxyl compound prepared above was charged and kept stirring at 50° C.

| the solution of polycarboxyl compound of (1) | 336.7 |
|---|---|
| isobutyl vinyl ether | 120.2 |
| hydrochloric acid, 35 weight % | 0.2 |
| methyl isobutyl ketone | 46.3 |
| (quantity in weight parts) | |

The reaction was finished when acid value of the mixture decreased to a value not more than 12 and the mixture was transferred to a separation funnel after cooling by standing. The reaction mixture was washed with 100 weight parts of alkaline water containing 10 weight % of sodium bicarbonate in the funnel and then washed with 300 weight parts of deionized water repeatedly until pH of the washing water became below 7. The organic layer was dried by adding Molecular Sieve 4A1/16 (a product of Wako Junyaku Co., Ltd.) and standing for 3 days at the room temperature. The solution of the compound A-4 thus prepared had 60.0 weight % of non-volatile matter and Gardener viscosity of E-F at 25° C.

(3) Preparation of Solution of Compound A-5

Into a flask of the same kind as the above, a mixture of the following composition including the solution of the polycarboxyl compound prepared above was charged and kept stirring at 60° C.

| the solution of polycarboxyl compound of (1) | 1277.5 |
|---|---|
| n-propyl vinyl ether | 447.9 |
| 2-ethylhexyl phosphate | 0.8 |
| (quantity in weight parts) | |

When the conversion obtained from the acid number reached 98% or more, the heating was stopped and excess amount of the vinyl ether and 348.2 weight parts of methyl isobutyl ketone were removed by vacuum distillation to obtain the solution of the compound A-5 containing 60 weight % of the effective component and the Gardener viscosity of I at 25° C.

EXAMPLE OF PREPARATION OF MATERIAL 5 AND 6

Solutions of two kinds of the compound (B), compounds B-1 and B-2, were prepared by the following method.

Into a four-necked flask equipped with a thermometer, a reflux condenser, a stirrer and a dropping funnel, 40.0 weight parts of solvent which was xylene was charged, heated under stirring and kept at 100° C. A mixture of monomers and a polymerization initiator shown in Table 3 ('component of dropped mixture') was added by dropping to the solvent at 100° C. at a constant rate for 2 hours. When the addition of the dropping component was finished, the mixture was kept at 100° C. for further 1 hour and, then, an additional amount of initiator solution shown in Table 3 ('additional catalyst') was added to the mixture. The mixture was kept at 100° C. for 2 hours before finishing the reaction and finally solutions of the compounds B-1 and B-2 having the characteristics shown in Table 3 were obtained.

TABLE 3

| Example of preparation of material | 5 | 6 |
|---|---|---|
| compound (A) | B-1 | B-2 |
| composition of dropped mixture (weight part) | | |
| glycidyl methacrylate | 28.40 | — |
| TMSPMA | — | 16.60 |
| MZ-11 | — | — |
| n-butyl methacrylate | 20.00 | 20.00 |
| methyl methacrylate | 27.70 | 51.19 |
| 2-ethylhexyl acrylate | 23.90 | 12.21 |
| n-butyl acetate | 54.00 | 54.00 |
| AIBN | 2.00 | 2.00 |
| additional catalyst (weight part) | | |
| n-butyl acetate | 3.80 | 3.80 |
| AIBN | 0.20 | 0.20 |
| properties | | |
| non-volatile matter (weight %) | 50.8 | 50.5 |
| Gardener viscosity | S | P–Q |

EXAMPLE OF PREPARATION OF MATERIAL 7 AND 8

Solutions of two kinds of compound (D), compounds D-1 and D-2, were prepared by the following method.

Into a four-necked flask equipped with a thermometer, a reflux condenser, a stirrer and a dropping funnel, an initial portion of solvent which was xylene was charged in an amount shown in Table 4, heated under stirring and kept at 80° C. A mixture of monomers and a polymerization initiator shown in Table 4 ('component of dropped mixture') was added by dropping to the solvent at 80° C. at a constant rate for 2 hours. When the addition of the dropping component was finished, the mixture was kept at 80° C. for further 1 hour and, then, an additional amount of initiator solution shown in Table 4 ('additional catalyst') was added to the mixture. The mixture was kept at 80° C. for 4 hours before finishing the reaction and finally solutions of the compounds D-1 and D-2 having the properties shown in Table 4 were obtained.

TABLE 4

| Example of preparation of material | 7 | 7 |
|---|---|---|
| compound (D) | D-1 | D-2 |
| xylene | 40.0 | 40.0 |
| composition of dropped mixture (weight part) | | |
| α,β-unsaturated compound A-3(a) | 36.0 | — |
| α,β-unsaturated compound A-2(a) | — | 19.5 |
| glycidyl methacrylate | 14.2 | — |
| 2-hydroxyethyl methacrylate | — | 32.5 |
| n-butyl methacrylate | 20.0 | 20.0 |
| methyl methacrylate | 18.5 | 18.8 |
| 2-ethylhexyl acrylate | 13.5 | 20.1 |
| TMSPMA | 16.6 | — |
| n-butyl acetate | 28.7 | 36.6 |

TABLE 4-continued

| Example of preparation of material | 7 | 7 |
|---|---|---|
| AIBN | 4.5 | 4.5 |
| additional catalyst (weight part) | | |
| n-butyl acetate | 7.6 | 7.6 |
| AIBN | 0.4 | 0.4 |
| properties | | |
| non-volatile matter (weight %) | 58.5 | 55.3 |
| Gardener viscosity (25° C.) | V–W | Y–Z |

EXAMPLES 1 TO 11

These examples show application of the composition to one coat solid color coating.

(1) Preparation of Coating Compositions

Components summarized in Table 5 were utilized for the preparation of the coating compositions. A part of or all materials were charged into a sand mill and dispersed until the particle size decreased to not more than 10 μm. Materials excluding following components were charged into the sand mill: Denacol EX-421 in Example 1, the compound B-2 in Example 2, Chemitite PZ-33 in Example 3, the compound A-4 in Example 4, Coronate EH in Example 5, Cymel 303 in Example 6, the compound B-1 in Example 7, KR-214 in Example 8, the compound B-7 in Example 9 and Cymel 303 in Example 11. All the raw materials were charged into the sand mill in Example 10. In Examples 1 through 9 and Example 11, one component coating compositions were prepared by adding the materials which were not treated by the sand mill to the materials treated by the sand mill. In Example 10, the materials treated by the sand mill were utilized for the preparation of one component coating compositions. The coating compositions prepared were diluted by a mixture of xylene and butyl acetate to the viscosity of 1 poise (measured by Brookfield type viscometer at 20° C.) and, after adding deionized water to make the water concentration of 0.3 weight %, stored in a sealed condition at 30° C. After the coating compositions were stored for 30 days at 30° C., viscosity was measured. The results summarized in Table 6 show that the increase of viscosity was very slight in all cases and that the coating compositions had excellent storage stability even though a considerable amount of water was present.

(2) Preparation of Test Piece

Cationic electrodeposit paint AQUA No.4200® (a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coating paint EPICO No.1500CP Sealer® (a product of NOF CORPORATION) was applied to the prepared plate by air spraying in an amount to form a film having dried thickness of 40 μm and the plate was baked at 140° C. for 30 minutes to obtain a base test piece.

The raw coating compositions prepared in (1) were diluted with thinner (a mixture of xylene and butyl acetate in 8 to 2 ratio) to a viscosity required for spraying (25 seconds at 20° C. by Ford cup No. 4) and applied to the base test piece prepared before by air spray coating. Test pieces were prepared by curing the coated pieces in the conditions shown in Table 6.

Results of the evaluation of coatings are shown in Table 6. In all cases, uniform coating having good gloss were prepared. All the coatings showed excellent acid resistance, impact resistance, weathering resistance and hardness when they were cured at 140° C.

Weathering resistance was evaluated by exposure for 1000 hours.

TABLE 5

(Part 1)

| Example | 1 | 2 | 3 | 4 | 5 | 6 |
|---|---|---|---|---|---|---|
| compounding recipe in weight parts | | | | | | |
| compound A-1 | 100 | — | — | — | 100 | — |
| compound A-2 | — | 100 | — | — | — | 100 |
| compound A-3 | — | — | 100 | — | — | — |
| compound A-4 | — | — | — | 50.0 | — | — |
| compound B-1 | — | — | — | 100 | — | — |
| compound B-2 | — | 100 | — | — | — | — |
| compound B-7 | — | — | — | — | — | — |
| compound D-1 | — | — | — | — | — | — |
| compound D-2 | — | — | — | — | — | — |
| EX-421 | 15.5 | — | — | — | — | — |
| PZ-33 | — | — | 16.1 | — | — | — |
| Coronate EH | — | — | — | — | 20.0 | — |
| Cymel 303 | — | — | — | — | — | 14.0 |
| KR-214 | — | — | — | — | — | — |
| titanium dioxide | 52.4 | 80.0 | 52.9 | 56.0 | 56.0 | 51.2 |
| Modaflow | 0.3 | 0.5 | 0.3 | 0.3 | 0.3 | 0.3 |
| 10% PTSA | — | — | — | — | — | 1.9 |
| 10% N-methyl-morpholine | — | — | — | — | — | 1.2 |
| xylene | 7 | 14 | 3 | 8 | 4 | 5 |
| n-butyl acetate | 2 | 4 | 2 | 3 | 2 | 2 |
| the compound (E) | | | | | | |
| n-propyl vinyl ether | 3.6 | 6.1 | 7.3 | — | — | — |
| isobutyl vinyl ether | — | — | — | 6.7 | 5.6 | — |
| 3,4-dihydro-2H-pyran | — | — | — | — | — | 5.4 |

(Part 2)

| Example | 7 | 8 | 9 | 10 | 11 |
|---|---|---|---|---|---|
| compounding recipe in weight parts | | | | | |
| compound A-1 | — | — | — | — | — |
| compound A-2 | — | — | — | — | — |
| compound A-3 | 100 | 100 | 100 | — | — |
| compound A-4 | — | — | — | — | — |
| compound B-1 | 100 | — | — | — | — |
| compound B-2 | — | — | — | — | — |
| compound B-7 | — | — | 10.9 | — | — |
| compound D-1 | — | — | — | 100 | — |
| compound D-2 | — | — | — | — | 100 |
| EX-421 | — | — | — | — | — |
| PZ-33 | — | — | — | — | — |
| Coronate EH | — | — | — | — | — |
| Cymel 303 | — | — | — | — | 10.5 |
| ICR-214 | — | 49.0 | — | — | — |
| titanium dioxide | 80.0 | 67.4 | 48.7 | 40.0 | 48.4 |
| Modaflow | 0.5 | 0.3 | 0.3 | 0.3 | 0.3 |
| 10% PTSA | — | — | 1.8 | — | 1.8 |
| 10% N-methyl-morpholine | — | — | 1.2 | — | 1.2 |
| xylene | 5 | 15 | 8 | 2 | 1 |
| n-butyl acetate | 4 | 3 | 2 | 3 | 2 |
| the compound (E) | | | | | |
| n-propyl vinyl ether | 15.2 | 11.6 | 2.0 | — | — |
| isobutyl vinyl ether | — | — | — | 7.6 | — |
| 3,4-dihydro-2H-pyran | — | — | — | — | 8.7 |

TABLE 6

(Part 1)

| Example | 1 | 2 | 3 |
|---|---|---|---|
| compound (A) | A-1 | A-2 | A-3 |
| compound (B) | EX-421 | B-2 | PZ-33 |
| | epoxy group | alkoxysilane group | imino group |
| compound (D) | — | — | — |
| ratio of mixing solid components | | | |
| (A) | 78.7 | 54.3 | 78.4 |
| (B) | 21.3 | 45.7 | 21.6 |
| (D) | — | — | — |
| storage stability | | | |

TABLE 6-continued

| (30° C.) | | | | | | |
|---|---|---|---|---|---|---|
| initial viscosity (poise) | 1.0 | | 1.0 | | 1.0 | |
| viscosity after 30 days (poise) | 2.5 | | 3.0 | | 4.0 | |
| curing condition | 120° C. 30 min | 140° C. 30 min | 120° C. 30 min | 140° C. 30 min | 120° C. 30 min | 140° C. 30 min |
| properties of coating[1] | | | | | | |
| acid resistance 1 | good | good | good | good | good | good |
| acid resistance 2 | stain | good | stain | good | stain | good |
| acid resistance 3 | good | good | good | good | cloud | good |
| impact resistance | good | good | good | good | good | good |
| weathering resistance | 83% | 87% | 90% | 94% | 81% | 85% |
| Knoop hardness | 8.8 | 10.8 | 10.0 | 11.0 | 9.1 | 10.5 |

(Part 2)

| Example | 4 | | 5 | | 6 | |
|---|---|---|---|---|---|---|
| compound (A) | A-4 | | A-1 | | A-2 | |
| compound (B) | B-1 epoxy group | | Coronate EH isocyanate group | | Cymel 303 alkylated aminomethylol group | |
| compound (D) | — | | — | | — | |
| ratio of mixing solid components | | | | | | |
| (A) | 37.1 | | 74.1 | | 81.1 | |
| (B) | 62.9 | | 25.9 | | 18.9 | |
| (D) | — | | — | | — | |
| storage stability (30° C.) | | | | | | |
| initial viscosity (poise) | 1.0 | | 1.0 | | 1.0 | |
| viscosity after 30 days (poise) | 2.8 | | 3.0 | | 2.5 | |
| curing condition | 120° C. 30 min | 140° C. 30 min | 120° C. 30 min | 140° C. 30 min | 120° C. 30 min | 140° C. 30 min |
| properties of coating[1] | | | | | | |
| acid resistance 1 | good | good | good | good | good | good |
| acid resistance 2 | stain | good | stain | good | good | good |
| acid resistance 3 | good | good | good | good | good | good |
| impact resistance | good | good | good | good | good | good |
| weathering resistance | 83% | 86% | 84% | 87% | 82% | 86% |
| Knoop hardness | 7.7 | 9.9 | 9.5 | 11.2 | 10.0 | 10.7 |

(Part 3)

| Example | 7 | | 8 | | 9 | |
|---|---|---|---|---|---|---|
| compound (A) | A-3 | | A-3 | | A-3 | |
| compound (B) | B-1 epoxy group | | KR-214 silanol group | | B-7 acetal group | |
| compound (D) | — | | — | | — | |
| ratio of mixing solid components | | | | | | |
| (A) | 53.5 | | 63.0 | | 84.3 | |
| (B) | 46.5 | | 37.0 | | 15.7 | |
| (D) | — | | — | | — | |
| storage stability (30° C.) | | | | | | |
| initial viscosity (poise) | 1.0 | | 1.0 | | 1.0 | |
| viscosity after 30 days (poise) | 2.6 | | 3.5 | | 2.8 | |
| curing condition | 120° C. 30 min | 140° C. 30 min | 120° C. 30 min | 140° C. 30 min | 120° C. 30 min | 140° C. 30 min |
| properties of coating[1] | | | | | | |
| acid resistance 1 | good | good | good | good | good | good |
| acid resistance 2 | stain | good | stain | good | good | good |
| acid resistance 3 | good | good | cloud | good | good | good |
| impact resistance | good | good | good | good | good | good |
| weathering resistance | 81% | 85% | 88% | 93% | 84% | 88% |

TABLE 6-continued

| Knoop hardness | 8.2 | 10.4 | 8.7 | 10.5 | 10.7 | 11.1 |

(Part 4)

| Example | 10 | | 11 | |
| --- | --- | --- | --- | --- |
| compound (A) | — | | — | |
| compound (B) | — | | Cymel 303 alkylated aminomethylol group | |
| compound (D) | D-1 epoxy group alkoxysilane group | | D-2 hydroxyl group | |
| ratio of mixing solid components | | | | |
| (A) | — | | — | |
| (B) | — | | 16.0 | |
| (D) | 100 | | 84.0 | |
| storage stability (30° C.) | | | | |
| initial viscosity (poise) | 1.0 | | 1.0 | |
| viscosity after 30 days (poise) | 3.0 | | 3.2 | |
| curing condition | 120° C. 30 min | 140° C. 30 min | 120° C. 30 min | 140° C. 30 min |
| properties of coating[1)] | | | | |
| acid resistance 1 | good | good | good | good |
| acid resistance 2 | stain | good | good | good |
| acid resistance 3 | good | good | good | good |
| impact resistance | good | good | good | good |
| weathering resistance | 82% | 87% | 81% | 85% |
| Knoop hardness | 9.5 | 11.3 | 10.2 | 10.8 |

[1)]good: no change was observed.
stain: slight stain was observed
cloud: surface was slightly cloudy

COMPARATIVE EXAMPLES 1 TO 11

The components for Examples 1 to 11 listed in Table 5 were used for Comparative examples 1 to 11 respectively except that the compound (E) was not used and coating compositions were prepared by the same method as in Examples 1 to 11. Change of viscosity caused by the absence of the compound (E) was compensated by using xylene.

The coating compositions thus prepared were evaluated on the storage stability by the same method as in Examples 1 to 11. In Comparative examples 1 to 11, viscosity increased remarkably with the period of storage, leading finally to gellation after 20 days because carboxyl groups were activated by the presence of a considerable amount of water and the compositions did not comprise the compound (E) to block the carboxyl group again.

EXAMPLES 12 TO 17

These examples show application of the composition to two coat one bake metallic color coating.

(1) Preparation of Clear Coating

One component clear coating compositions were prepared by mixing raw materials shown in Table 7. The clear coating compositions prepared were evaluated on storage stability by the same method as in Example 1 to 11. Increase of viscosity was very slight in all cases tested and the coating compositions were shown to have excellent storage stability as shown in Table 8 even though a considerable amount of water was present.

2) Preparation of Test Piece

Raw coating compositions thus prepared were diluted by the same method as in Examples 1 to 11. Base test pieces were also prepared by the same method as in Examples 1 to 11. A silver metallic base coating composition, BELCOAT No.6000® (a product of NOF CORPORATION) was applied to the base test piece by air spraying with interval of 1 minute 30 seconds in 2 stages in an amount to form a film having dried thickness of 15 μm. After the test pieces were set at 20° C. for 3 minutes, the diluted raw clear coating compositions were coated by air spray coating and the test pieces were cured in the condition shown in Table 8 to prepare final test pieces.

Results of the evaluation listed in Table 8 show that, in all cases, uniform coatings having good gloss were prepared and the coating showed excellent acid resistance, impact resistance, weathering resistance and hardness when they were cured at 140° C.

Weathering resistance was evaluated by the same method as in Table 6.

TABLE 7

| Example | 12 | 13 | 14 | 15 | 16 | 17 |
| --- | --- | --- | --- | --- | --- | --- |
| compounding recipe in weight parts | | | | | | |
| compound A-2 | 100 | — | — | — | — | — |
| compound A-4 | — | 50 | — | — | — | 50 |
| compound A-5 | — | — | — | — | 29.4 | — |
| compound B-1 | — | 100 | — | — | — | 100 |

TABLE 7-continued

| Example | 12 | 13 | 14 | 15 | 16 | 17 |
|---|---|---|---|---|---|---|
| compound B-2 | 100 | — | — | — | — | — |
| compound D-1 | — | — | 100 | — | — | — |
| compound D-2 | — | — | — | 100 | — | — |
| Cymel 303 | — | — | — | 10.5 | — | — |
| CX-RS-3200 | — | — | — | — | 100 | — |
| Modaflow | 0.2 | 0.1 | 0.1 | 0.1 | 0.1 | — |
| 10% PTSA | — | — | — | 1.8 | 1.8 | — |
| 10% N-methyl-morpholine | — | — | — | 1.1 | 1.1 | — |
| zinc octanoate | — | — | — | — | — | 2.5 |
| triethyl phosphate | — | — | — | — | — | 18.3 |
| xylene | 5 | 4 | 3 | 3 | 3 | 2 |
| n-butyl acetate | 1 | 1 | 1 | 1 | 1 | 1 |
| the compound (E) | | | | | | |
| n-propyl vinyl ether | 4.2 | — | — | — | — | — |
| isobutyl vinyl ether | — | 2.5 | 6.0 | 2.2 | 2.6 | 3.2 |

TABLE 8

(Part 1)

| Example | 12 | 13 |
|---|---|---|
| compound (A) | A-2 | A-4 |
| compound (B) | B-2 | B-1 |
| | alkoxysilane group | epoxy group |
| compound (D) | — | — |
| ratio of mixing solid components | | |
| (A) | 54.3 | 37.1 |
| (B) | 45.7 | 62.9 |
| (D) | — | — |
| storage stability (30° C.) | | |
| initial viscosity (poise) | 1.0 | 1.0 |
| viscosity after 30 days (poise) | 1.2 | 1.2 |
| curing condition | 120° C. 30 min / 140° C. 30 min | 120° C. 30 min / 140° C. 30 min |
| properties of coating[1] | | |
| acid resistance 1 | good / good | good / good |
| acid resistance 2 | stain / good | stain / good |
| acid resistance 3 | cloud / good | good / good |
| impact resistance | good / good | good / good |
| weathering resistance | good / good | good / good |
| Knoop hardness | 8.8 / 10.9 | 9.0 / 11.2 |

(Part 2)

| Example | 14 | 15 |
|---|---|---|
| compound (A) | — | — |
| compound (B) | — | Cymel 303 alkylated aminomethylol group |
| compound (D) | D-1 epoxy group alkoxysilane group | D-2 hydroxyl group |
| ratio of mixing solid components | | |
| (A) | — | — |
| (B) | — | 16.0 |
| (D) | 100 | 84.0 |
| storage stability (30° C.) | | |
| initial viscosity (poise) | 1.0 | 1.0 |
| viscosity after 30 days (poise) | 1.2 | 1.2 |
| curing condition | 120° C. 30 min / 140° C. 30 min | 120° C. 30 min / 140° C. 30 min |
| properties of coating[1] | | |
| acid resistance 1 | good / good | good / good |
| acid resistance 2 | stain / good | good / good |
| acid resistance 3 | good / good | good / good |
| impact resistance | good / good | good / good |
| weathering resistance | good / good | good / good |
| Knoop hardness | 8.1 / 10.3 | 10.8 / 11.5 |

(Part 3)

| Example | 16 | 17 |
|---|---|---|
| compound (A) | A-5 | A-4 |
| compound (B) | CX-RS-3200 oxazoline group | B-1 epoxy group |
| compound (D) | — | — |
| ratio of mixing solid components | | |
| (A) | 29.4 | 37.1 |
| (B) | 70.6 | 62.9 |
| (D) | — | — |
| storage stability (30° C.) | | |
| initial viscosity (poise) | 1.0 | 1.0 |
| viscosity after 30 days (poise) | 1.2 | 1.3 |
| curing condition | 120° C. 30 min / 140° C. 30 min | 120° C. 30 min / 140° C. 30 min |
| properties of coating[1] | | |
| acid resistance 1 | good / good | good / good |
| acid resistance 2 | good / good | good / good |
| acid resistance 3 | good / good | good / good |
| impact resistance | good / good | good / good |
| weathering resistance | good / good | good / good |
| Knoop hardness | 9.5 / 11.9 | 11.0 / 12.3 |

[1] good: No change was observed.
stain: slight stain was observed
cloud: surface was slightly cloudy

COMPARATIVE EXAMPLES 12 TO 17

The components for Examples 12 to 17 listed in Table 7 were used for Comparative examples 12 to 17 respectively except that the compound (E) was not used and coating compositions were prepared by the same method as in Examples 12 to 17. Change of viscosity caused by the absence of the compound (E) was compensated by using xylene.

The coating compositions thus prepared were evaluated on the storage stability by the same method as in Examples 12 to 17. In Comparative examples 12 to 17, viscosity increased remarkably with the period of storage, leading finally to gellation after 20 days because carboxyl groups were activated by the presence of a considerable amount of water and the compositions did not comprise the compound (E) to block the carboxyl group again.

EXAMPLES 18 TO 21

Four kinds of thermal latent acid catalysts F-1 to F-4 were prepared by the following method.

Into test tubes, 50.0 weight parts each of a mixed solvent of methyl isobutyl ketone and ethyl acetate in 1/1 weight ratio were charged and components for the thermal latent acid catalysts shown in Table 9 were added to the solutions under stirring.

The test tubes were left standing for 3 hours and 50 weight % solutions of thermal latent acid catalysts F-1 to F-4 were obtained.

TABLE 9

| Example | 18 | 19 | 20 | 21 |
|---|---|---|---|---|
| thermal latent acid catalyst | F-1 | F-2 | F-3 | F-4 |
| compounding recipe in weight parts | | | | |
| Lewis acid | | | | |
| zinc octanoate | 20.1 | — | — | 32.1 |
| dibutyltin dilaurate | — | 34.8 | — | — |
| tin octanoate | — | — | 22.4 | — |
| Bronsted acid salt | | | | |
| acid | | | | |
| di(2-ethylhexyl)- sulfosuccinic acid | 24.1 | — | 23.3 | — |
| (2-ethylhexyl) phosphate | — | 9.7 | — | — |
| monochloroacetic acid | — | — | — | 8.7 |
| base | | | | |
| N-methylmorpholine | 5.8 | 5.5 | — | — |
| pyridine | — | — | 4.3 | — |
| triethylamine | — | — | — | 9.2 |
| solvent | | | | |
| methyl isobutyl ketone | 25.0 | 25.0 | 25.0 | 25.0 |
| ethyl acetate | 25.0 | 25.0 | 25.0 | 25.0 |

EXAMPLES 22 TO 26

These examples show application of the composition to one coat solid color coating.

(1) Preparation of Coating Material

Components summarized in Table 10 were utilized for the preparation of the coating materials. A part of or all materials were charged into a sand mill and dispersed until the particle size decreased to not more than 10 μm. Materials excluding following components were charged into the sand mill: Denacol EX-421 in Example 22, the compound B-2 in Example 23, the compound B-1 in Example 24 and the compound A-4 in Example 25. All the raw materials were charged into the sand mill in Example 26. In Examples 22 to 25, one component coating compositions were prepared by adding the materials which were not treated by the sand mill to the materials treated by the sand mill. In Example 26, the materials treated by the sand mill were utilized for the preparation of one component coating composition. The coating compositions prepared were diluted with thinner (a mixture of xylene and butyl acetate in 8 to 2 weight ratio) to the viscosity of 1 poise (measured by Brookfield type viscometer at 20° C.) and stored in a sealed condition at 50° C. After the coating compositions were stored for 30 days at 50° C., viscosity was measured. The results summarized in Table 11 show that the increase of viscosity was very slight in all cases and that the coating materials had excellent storage stability.

(2) Preparation of Test Piece

Cationic electrodeposit paint AQUA No.4200 ® (a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coating paint EPICO No.1500CP Sealer ® (a product of NOF CORPORATION, Ltd.) was applied to the prepared plate by air spraying in an amount to form a film having dried thickness of 40 μm and the plate was baked at 140° C. for 30 minutes to obtain a base test piece.

The raw coating materials prepared in (1) were diluted with thinner (a mixture of xylene and butyl acetate in 8 to 2 ratio) to a viscosity required for spraying (25 seconds at 20° C. by Ford cup No. 4) and applied to the base test piece prepared before by air spray coating. Test pieces were prepared by curing the coated pieces in the conditions shown in Table 11.

Results of the evaluation of coatings are shown in Table 11. In all cases, uniform coating having good gloss were prepared. All the coatings showed excellent acid resistance, impact resistance, weathering resistance and hardness.

Weathering resistance was evaluated by the same method as in Table 6.

TABLE 10

| Example | 22 | 23 | 24 | 25 | 26 |
|---|---|---|---|---|---|
| compounding recipe in weight parts | | | | | |
| compound A-1 | 100 | — | — | — | — |
| compound A-2 | — | 100 | — | — | — |
| compound A-3 | — | — | 100 | — | — |
| compound A-4 | — | — | — | 50.0 | — |
| compound B-2 | — | 100 | — | — | — |
| compound B-1 | — | — | 100 | 100 | — |
| compound D-1 | — | — | — | — | 100 |
| EX-421 | 15.5 | — | — | — | — |
| titanium dioxide | 52.4 | 80.0 | 80.0 | 56.0 | 40.0 |
| Modaflow | 0.3 | 0.5 | 0.5 | 0.3 | 0.3 |
| acid catalyst F-1 | 3.9 | — | — | 4.3 | — |
| acid catalyst F-2 | — | 6.2 | — | — | — |
| acid catalyst F-3 | — | — | — | — | 3.3 |
| acid catalyst F-4 | — | — | 3.7 | — | — |
| xylene | 8.0 | 14.0 | 16.0 | 12.0 | 8.0 |
| n-butyl acetate | 2.0 | 3.5 | 4.0 | 3.0 | 2.0 |

TABLE 11

(Part 1)

| Example | 22 | 23 | 24 |
|---|---|---|---|
| compound (A) | A-1 | A-2 | A-3 |
| compound (B) | EX-421 | B-1 | B-2 |
|  | epoxy group | alkoxysilane group | epoxy group |
| compound (D) | — | — | — |
| acid catalyst (F) | F-1 | F-2 | F-4 |
| ratio of mixing solid components | | | |
| (A) | 78.7 | 54.3 | 53.5 |
| (B) | 21.3 | 45.7 | 46.5 |
| (D) | — | — | — |
| content of (F) (weight %) 100 × (F)/{(A) + (B) + (D)} | 2.68 | 2.80 | 1.69 |
| storage stability (50° C.) | | | |
| initial viscosity (poise) | 1.0 | 1.0 | 1.0 |
| viscosity after 30 days (poise) | 1.2 | 1.3 | 1.2 |
| curing condition | 120° C. × 30 min | 120° C. × 30 min | 120° C. × 30 min |
| properties of coating[1)] | | | |
| acid resistance 1 | good | good | good |
| acid resistance 2 | good | good | good |
| acid resistance 3 | good | good | good |
| impact resistance | good | good | good |
| weathering resistance | 83% | 90% | 85% |
| Knoop hardness | 10.9 | 11.8 | 11.6 |

(Part 2)

| Example | 25 | 26 |
|---|---|---|
| compound (A) | A-4 | — |
| compound (B) | B-2 | — |
|  | epoxy group | |
| compound (D) | — | D-1 |
|  | | epoxy group alkoxysilane group |
| acid catalyst (F) | F-1 | F-3 |
| ratio of mixing solid components | | |
| (A) | 37.1 | — |
| (B) | 62.9 | — |
| (D) | — | 100 |
| content of (F) (weight %) 100 × (F)/{(A) + (B) + (D)} | 2.66 | 2.82 |
| storage stability (50° C.) | | |
| initial viscosity (poise) | 1.0 | 1.0 |
| viscosity after 30 days (poise) | 1.2 | 1.3 |
| curing condition | 120° C. × 30 min | 120° C. × 30 min |
| properties of coating[1)] | | |
| acid resistance 1 | good | good |
| acid resistance 2 | good | good |
| acid resistance 3 | good | good |
| impact resistance | good | good |
| weathering resistance | 86% | 87% |
| Knoop hardness | 12.1 | 12.0 |

[1)]good: no change was observed.

COMPARATIVE EXAMPLES 18 AND 19

Components listed in Table 12 were utilized for the preparation of the coating compositions. The components were dispersed and made into coating compositions by the same method as in Examples 22 to 26. The materials excluding polycarboxylic acid of Example of preparation of material A-4 (a) in Comparative example 18 and excluding the compound A-4 in Comparative example 19 were dispersed by using a sand mill and utilized for preparation of coating compositions.

The coating materials thus prepared were evaluated on the storage stability by the same method as in Examples 22 to 26. As shown in Table 13, in Comparative example 18, viscosity increased remarkably with the period of storage, leading finally to gellation after 5 days, because neither carboxyl group or epoxy group was blocked to prevent crosslinking reaction of the both functional groups under the storage condition.

Weathering resistance was evaluated by the same method as in Table 6.

TABLE 12

| Comparative example | 18 | 19 |
|---|---|---|
| compounding recipe in weight parts | | |
| polycarboxylic acid A-4 (a) | 33.3 | — |
| compound A-4 | — | 50.0 |
| compound B-1 | 100 | 100 |
| titanium dioxide JR-602 | 56.0 | 56.0 |
| Modaflow | 0.3 | 0.3 |
| catalyst F-1 | 3.8 | — |
| zinc octanoate | — | 0.9 |
| xylene | 8.0 | 12.0 |
| n-butyl acetate | 2.0 | 3.0 |

TABLE 13

| Comparative example | 18 | 19 |
|---|---|---|
| compound (A) | polycarboxylic acid A-4 (a) | A-4 |
| compound (B) | B-1 epoxy group | B-1 epoxy group |
| acid catalyst (F) | F-1 | zinc octanoate |
| ratio of mixing solid components | | |
| (A) | 28.6 | 37.1 |
| (B) | 71.4 | 62.9 |
| content of (F) (weight %) 100 × (F)/{(A) + (B)} | 2.68 | 1.11 |
| storage stability (50° C.) | | |
| initial viscosity (poise) | 1.0 | 1.0 |
| viscosity after 30 days (poise) | gel after 5 days | gel after 2 days |
| curing condition | 120° C. × 30 min | 120° C. × 30 min |
| properties of coating[1] | | |
| acid resistance 1 | good | good |
| acid resistance 2 | good | good |
| acid resistance 3 | good | good |
| impact resistance | good | good |
| weathering resistance | 87% | 89% |
| Knoop hardness | 12.0 | 12.4 |

[1]good: no change was observed.

EXAMPLES 27 TO 29

These examples show application of the composition to two coat one bake metallic color coating.

(1) Preparation of Clear Coating Compositions

One component clear coating compositions were prepared by mixing raw materials shown in Table 14. The clear coating compositions prepared were evaluated on storage stability by the same method as in Example 22 to 26. As shown in Table 15, increase of viscosity was very slight in all cases tested and coating materials were shown to have excellent storage stability.

2) Preparation of Test Pieces

Raw coating materials thus prepared were diluted by the same method as in Examples 22 to 26. Base test pieces were also prepared by the saµme method as in Examples 22 through 26. A silver metallic base coating composition BELCOAT No.6000® (a product of NOF CORPORATION) was applied to the base test piece by air spraying with interval of 1 minute 30 seconds in 2 stages in an amount to form a film having dried thickness of 15 µm. After the test piece was set at 20° C. for 3 minutes, the diluted raw clear coating compositions were coated by air spray coating and the test pieces were cured in the condition shown in Table 15 to prepare final test pieces.

Results of evaluation listed in Table 15 show that, in all cases, uniform coating films having good gloss were prepared and the coating showed excellent acid resistance, impact resistance, weathering resistance and hardness.

Weathering resistance was evaluated by the same method as in Table 6.

TABLE 14

| Example | 27 | 28 | 29 |
|---|---|---|---|
| compounding recipe in weight parts | | | |
| compound A-2 | 33.3 | — | — |
| compound A-4 | — | 50.0 | — |
| compound B-2 | 100 | — | — |
| compound B-1 | — | 100 | — |
| compound D-1 | — | — | 100 |
| Modaflow | 0.2 | 0.1 | 0.1 |
| catalyst F-1 | — | 4.3 | — |
| catalyst F-2 | 6.2 | — | — |
| catalyst F-3 | — | — | 3.3 |
| xylene | 3.5 | 3.0 | 2.0 |
| n-butyl acetate | 0.9 | 0.8 | 0.5 |

TABLE 15

| Example | 27 | 28 | 29 |
|---|---|---|---|
| compound (A) | A-2 | A-4 | — |
| compound (B) | B-2 alkoxysilane group | B-1 epoxy group | — |
| compound (D) | — | — | D-1 epoxy group alkoxysilane group |
| acid catalyst (F) | F-2 | F-1 | F-3 |
| ratio of mixing solid components | | | |
| (A) | 54.3 | 37.1 | — |
| (B) | 45.7 | 62.9 | — |
| (D) | — | — | 100 |
| content of (F) (weight %) 100 × (F)/{(A) + (B) + (D)} | 2.80 | 2.66 | 2.82 |
| storage stability (50° C.) | | | |
| initial viscosity (poise) | 1.0 | 1.0 | 1.0 |

TABLE 15-continued

| Example | 27 | 28 | 29 |
|---|---|---|---|
| viscosity after 30 days (poise) | 1.3 | 1.2 | 1.3 |
| curing condition properties of coating[1] | 120° C. × 30 min | 120° C. × 30 min | 120° C. × 30 min |
| acid resistance 1 | good | good | good |
| acid resistance 2 | good | good | good |
| acid resistance 3 | good | good | good |
| impact resistance | good | good | good |
| weathering resistance | good | good | good |
| Knoop hardness | 10.9 | 11.3 | 11.1 |

[1]good: no change was observed.

COMPARATIVE EXAMPLES 20 AND 21

Clear coating materials were prepared by using materials of the compositions shown in Table 16 and evaluated on storage stability by the same method as in Examples 22 to 26.

In Comparative example 20, as shown in Table 17, viscosity increased remarkably with the period of storage, leading finally to gellation after 5 days, because neither carboxyl group or epoxy group was blocked to prevent crosslinking reaction of the both functional groups under the storage condition.

In Comparative example 21, as shown in Table 17, viscosity increased remarkably with the period of storage, leading finally to gellation after 2 days, because the organometallic compound was not the thermal latent type compound and the regeneration of free carboxyl group and the crosslinking reaction between the carboxyl group and the epoxy group took place.

Weathering resistance was evaluated by the same method as in Table 6.

TABLE 16

| Comparative example | 20 | 21 |
|---|---|---|
| compounding recipe in weight parts | | |
| polycarboxylic acid A-4 (a) | 33.3 | — |
| compound A-4 | — | 50.0 |
| compound B-1 | 100 | 100 |
| Modaflow | 0.1 | 0.1 |
| catalyst F-1 | 3.8 | — |
| zinc octanoate | — | 0.9 |
| xylene | 2.0 | 3.0 |
| n-butyl acetate | 0.5 | 0.8 |

TABLE 17

| Comparative example | 20 | 21 |
|---|---|---|
| compound (A) | polycarboxylic acid A-4 (a) | A-4 |
| compound (B) | B-2 | B-2 |
| acid catalyst (F) | epoxy group F-1 | epoxy group zinc octanoate |
| ratio of mixing solid components | | |
| (A) | 28.6 | 37.1 |
| (B) | 71.4 | 62.9 |
| content of (F) (weight %) 100 × (F)/{(A) + (B)} | 2.68 | 1.11 |
| storage stability (50° C.) | | |
| initial viscosity (poise) | 1.0 | 1.0 |
| viscosity after 30 days (poise) | gel after 5 days | gel after 2 days |
| curing condition properties of coating[1] | 120° C. × 30 min | 120° C. × 30 min |
| acid resistance 1 | good | good |
| acid resistance 2 | good | good |
| acid resistance 3 | good | good |
| impact resistance | good | good |
| weathering resistance | good | good |
| Knoop hardness | 11.1 | 11.5 |

[1]good: no change was observed.

EXAMPLES 30 TO 47

Thermal latent acid catalysts F-5 to F-22 were prepared by the following method.

Into test tubes, 10 weight parts each of the mixed solvent of methyl isobutyl ketone and ethyl acetate in 1/1 weight ratio were charged and the components for the thermal latent acid catalysts shown in Table 18 were added to the solutions under stirring. The test tubes were left standing for 3 hours and, after removing the solvent in vacuo, thermal latent acid catalysts F-5 to F-21 were obtained in amounts and yields shown in Table 18.

TABLE 18

(Part 1)

| Example | 30 | 31 | 32 | 33 | 34 | 35 |
|---|---|---|---|---|---|---|
| thermal latent acid catalyst | F-5 | F-6 | F-7 | F-8 | F-9 | F-10 |
| compounding recipe in weight parts | | | | | | |
| Lewis acid | | | | | | |
| zinc chloride | 1.36 | 1.36 | 1.36 | 1.36 | 1.36 | 1.36 |
| zinc bromide | — | — | — | — | — | — |
| Bronsted acid salt | | | | | | |
| acid | | | | | | |
| 2-ethylhexanoic acid | 1.44 | 1.44 | 1.44 | — | — | — |
| (2-ethylhexyl) phosphate | — | — | — | 1.76 | 1.76 | 1.76 |
| di(2-ethylhexyl) sulfosuccinic acid | — | — | — | — | — | — |
| base | | | | | | |
| triethylamine | 1.01 | — | — | 1.01 | — | — |
| N-methyl-morpholine | — | 1.01 | — | — | 1.01 | — |
| pyridine | — | — | 0.79 | — | — | 0.79 |
| solvent | | | | | | |
| methyl isobutyl ketone | 5.0 | 5.0 | 5.0 | 5.0 | 5.0 | 5.0 |
| ethyl acetate | 5.0 | 5.0 | 5.0 | 5.0 | 5.0 | 5.0 |
| yield (weight part) | 3.6 | 3.7 | 3.5 | 3.6 | 3.8 | 3.7 |
| yield (%) | 94 | 97 | 97 | 97 | 92 | 95 |

(Part 2)

TABLE 18-continued

| Example | 36 | 37 | 38 | 39 | 40 | 41 |
|---|---|---|---|---|---|---|
| thermal latent acid catalyst compounding recipe in weight parts | F-11 | F-12 | F-13 | F-14 | F-15 | F-16 |
| Lewis acid | | | | | | |
| zinc chloride | 1.36 | 1.36 | 1.36 | — | — | — |
| zinc bromide | — | — | — | 2.25 | 2.25 | 2.25 |
| Bronsted acid salt | | | | | | |
| acid | | | | | | |
| 2-ethylhexanoic acid | — | — | — | 1.44 | 1.44 | 1.44 |
| (2-ethylhexyl) phosphate | — | — | — | — | — | — |
| di(2-ethylhexyl) sulfosuccinic acid | 4.23 | 4.23 | 4.23 | — | — | — |
| base | | | | | | |
| triethylamine | 1.01 | — | — | 1.01 | — | — |
| N-methyl-morpholine | — | 1.01 | — | — | 1.01 | — |
| pyridine | — | — | 0.79 | — | — | 0.79 |
| solvent | | | | | | |
| methyl isobutyl ketone | 5.0 | 5.0 | 5.0 | 5.0 | 5.0 | 5.0 |
| ethyl acetate | 5.0 | 5.0 | 5.0 | 5.0 | 5.0 | 5.0 |
| yield (weight part) | 5.8 | 5.5 | 5.1 | 4.1 | 4.2 | 4.1 |
| yield (%) | 88 | 83 | 80 | 87 | 89 | 92 |

(Part 3)

| Example | 42 | 43 | 44 | 45 | 46 | 47 |
|---|---|---|---|---|---|---|
| thermal latent acid catalyst compounding recipe in weight parts | F-17 | F-18 | F-19 | F-20 | F-21 | F-22 |
| Lewis acid | | | | | | |
| zinc chloride | — | — | — | — | — | — |
| zinc bromide | 2.25 | 2.25 | 2.25 | 2.25 | 2.25 | 2.25 |
| Bronsted acid salt | | | | | | |
| acid | | | | | | |
| 2-ethylhexanoic acid | — | — | — | — | — | — |
| (2-ethylhexyl) phosphate | 1.76 | 1.76 | 1.76 | — | — | — |
| di(2-ethylhexyl) sulfosuccinic acid | — | — | — | 4.23 | 4.23 | 4.23 |
| base | | | | | | |
| triethylamine | 1.01 | — | — | 1.01 | — | — |
| N-methyl-morpholine | — | 1.01 | — | — | 1.01 | — |
| pyridine | — | — | 0.79 | — | — | 0.79 |
| solvent | | | | | | |
| methyl isobutyl ketone | 5.0 | 5.0 | 5.0 | 5.0 | 5.0 | 5.0 |
| ethyl acetate | 5.0 | 5.0 | 5.0 | 5.0 | 5.0 | 5.0 |
| yield (weight part) | 4.5 | 4.0 | 3.9 | 6.5 | 6.0 | 5.9 |
| yield (%) | 90 | 80 | 81 | 87 | 80 | 81 |

EXAMPLES 48 TO 57

These examples show application of the composition to one coat solid color coating.

(1) Preparation of Coating Material

Components summarized in Table 19 were utilized for the preparation of the coating materials. A part of or all materials were charged into a sand mill and dispersed until the particle size decreased to not more than 10 μm. Materials excluding following components were charged into the sand mill: Denacol EX-421 in Example 48, the compound B-2 in Example 49, Chemitite PZ-33 in Example 50, the compound A-4 in Example 51, Coronate EH in Example 52, Cymel 303 in Example 53, the compound B-1 in Example 54, KR-214 in Example 55 and Cymel 303 in Example 57. All the raw materials were charged into the sand mill in Example 56. In Examples 48 to 55 and Example 57, one component coating compositions were prepared by adding the materials which were not treated by the sand mill to the materials treated by the sand mill. In Example 56, the materials treated by the sand mill were utilized for the preparation of one component coating composition. The coating compositions prepared were diluted with thinner (a mixture of xylene and butyl acetate in 8 to 2 weight ratio) to the viscosity of 1 poise (measured by Brookfield type viscometer at 20° C.) and stored in a sealed condition at 50° C. After the coating compositions were stored for 30 days at 50° C., viscosity was measured. The results summarized in Table 20 show that the increase of viscosity was very slight in all cases and that the coating materials had excellent storage stability.

(2) Preparation of Test Piece

Cationic electrodeposit paint AQUA No.4200 ® (a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coating paint EPICO No.1500CP Sealer ® (a product of NOF CORPORATION) was applied to the prepared plate by air spraying in an amount to form a film having dried thickness of 40 μm and the plate was baked at 140° C. for 30 minutes to obtain a base test piece.

The raw coating materials prepared in (1) were diluted with thinner (a mixture of xylene and butyl acetate in 8 to 2 ratio) to a viscosity required for spraying (25 seconds at 20° C. by Ford cup No. 4) and applied to the base test piece prepared before by air spray coating. Test pieces were prepared by curing the coated pieces in the conditions shown in Table 20.

Results of the evaluation of coatings are shown in Table 20. In all cases, uniform coating having good gloss were prepared. All the coatings showed excellent acid resistance, impact resistance, weathering resistance and hardness.

Weathering resistance was evaluated by the same method as in Table 6.

TABLE 19

(Part 1)

| Example | 48 | 49 | 50 | 51 | 52 | 53 |
|---|---|---|---|---|---|---|
| compounding recipe in weight parts | | | | | | |
| compound A-1 | 100 | — | — | — | 100 | — |
| compound A-2 | — | 100 | — | — | — | 100 |
| compound A-3 | — | — | 100 | — | — | — |
| compound A-4 | — | — | — | 50.0 | — | — |
| compound B-1 | — | — | — | 100 | — | — |
| compound B-2 | — | 100 | — | — | — | — |
| compound D-1 | — | — | — | — | — | — |

TABLE 19-continued

| | | | | | | |
|---|---|---|---|---|---|---|
| compound D-2 | — | — | — | — | — | — |
| EX-421 | 15.5 | — | — | — | — | — |
| PZ-33 | — | — | 16.1 | — | — | — |
| Coronate EH | — | — | — | — | 20.0 | — |
| Cymel 303 | — | — | — | — | — | 14.0 |
| KR-214 | — | — | — | — | — | — |
| titanium dioxide | 52.4 | 80.0 | 52.9 | 56.0 | 56.0 | 51.2 |
| Modaflow | 0.3 | 0.5 | 0.3 | 0.3 | 0.3 | 0.3 |
| acid catalyst F-14 | 2.6 | 4.0 | — | — | — | — |
| acid catalyst F-20 | — | — | 4.3 | — | — | — |
| acid catalyst F-15 | — | 2.9 | 2.8 | 2.7 | — | — |
| acid catalyst F-5 | — | — | — | — | — | — |
| xylene | 10 | 20 | 10 | 15 | 10 | 10 |
| n-butyl acetate | 2 | 4 | 2 | 3 | 2 | 2 |

(Part 2)

| Example | 54 | 55 | 56 | 57 |
|---|---|---|---|---|
| compounding recipe in weight parts | | | | |
| compound A-1 | — | — | — | — |
| compound A-2 | — | — | — | — |
| compound A-3 | 100 | 100 | — | — |
| compound A-4 | — | — | — | — |
| compound B-1 | 100 | — | — | — |
| compound B-2 | — | — | — | — |
| compound D-1 | — | — | 100 | — |
| compound D-2 | — | — | — | 100 |
| EX-421 | — | — | — | — |
| PZ-33 | — | — | — | — |
| Coronate EH | — | — | — | — |
| Cymel 303 | — | — | — | 10.5 |
| KR-214 | — | 49.0 | — | — |
| titanium dioxide | 80.0 | 67.4 | 40.0 | 48.4 |
| Modaflow | 0.5 | 0.3 | 0.3 | 0.3 |
| acid catalyst F-14 | — | 3.3 | 2.1 | — |
| acid catalyst F-20 | — | — | — | — |
| acid catalyst F-15 | — | — | — | — |
| acid catalyst F-5 | 3.2 | — | — | 1.9 |
| xylene | 20 | 15 | 10 | 10 |
| n-butyl acetate | 4 | 3 | 2 | 2 |

TABLE 20

(Part 1)

| Example | 48 | 49 | 50 |
|---|---|---|---|
| compound (A) | A-1 | A-2 | A-3 |
| compound (B) | EX-421 epoxy group | B-2 alkoxysilane group | PZ-33 imino group |
| compound (D) | — | — | — |
| thermal latent acid catalyst (F) | catalyst F-14 | catalyst F-14 | catalyst F-20 |
| ratio of mixing solid components | | | |
| (A) | 78.7 | 54.3 | 78.4 |
| (B) | 21.3 | 45.7 | 21.6 |
| (D) | — | — | — |
| content of (F) (weight %) $100 \times (F)/\{(A) + (B) + (D)\}$ | 3.60 | 3.60 | 5.73 |
| storage stability (50° C.) | | | |
| initial viscosity (poise) | 1.0 | 1.0 | 1.0 |
| viscosity after 30 days (poise) | 1.1 | 1.2 | 1.3 |
| curing condition | 120° C. 30 min / 140° C. 30 min | 120° C. 30 min / 140° C. 30 min | 120° C. 30 min / 140° C. 30 min |
| properties of coating[1]) | | | |
| acid resistance 1 | good / good | good / good | good / good |
| acid resistance 2 | stain / good | stain / good | stain / good |
| acid resistance 3 | good / good | good / good | cloud / good |
| impact resistance | good / good | good / good | good / good |
| weathering resistance | 83% / 87% | 90% / 94% | 81% / 85% |
| Knoop hardness | 8.8 / 10.8 | 10.0 / 11.0 | 9.1 / 10.5 |

(Part 2)

| Example | 51 | 52 | 53 |
|---|---|---|---|

TABLE 20-continued

| compound (A) | A-4 | A-1 | A-2 |
|---|---|---|---|
| compound (B) | B-1 | Coronate EH | Cymel 303 |
| | epoxy group | isocyanate group | alkylated aminomethylol group |
| compound (D) | — | — | — |
| thermal latent acid catalyst (F) | catalyst F-15 | catalyst F-15 | catalyst F-15 |
| ratio of mixing solid components | | | |
| (A) | 37.1 | 74.1 | 81.1 |
| (B) | 62.9 | 25.9 | 18.9 |
| (D) | — | — | — |
| content of (F) (weight %) 100 × (F)/{(A) + (B) + (D)} | 3.60 | 3.60 | 3.60 |
| storage stability (50° C.) | | | |
| initial viscosity (poise) | 1.0 | 1.0 | 1.0 |
| viscosity after 30 days (poise) | 1.1 | 1.1 | 1.1 |
| curing condition | 120° C. 30 min / 140° C. 30 min | 120° C. 30 min / 140° C. 30 min | 120° C. 30 min / 140° C. 30 min |
| properties of coating[1] | | | |
| acid resistance 1 | good / good | good / good | good / good |
| acid resistance 2 | stain / good | stain / good | good / good |
| acid resistance 3 | good / good | good / good | good / good |
| impact resistance | good / good | good / good | good / good |
| weathering resistance | 83% / 86% | 84% / 87% | 82% / 86% |
| Knoop hardness | 7.7 / 9.9 | 9.5 / 11.2 | 10.0 / 10.7 |

(Part 3)

| Example | 54 | 55 |
|---|---|---|
| compound (A) | A-3 | A-3 |
| compound (B) | B-1 | KR-214 |
| | epoxy group | silanol group |
| compound (D) | — | — |
| thermal latent acid catalyst (F) | catalyst F-5 | catalyst F-14 |
| ratio of mixing solid components | | |
| (A) | 53.5 | 63.0 |
| (B) | 46.5 | 37.0 |
| (D) | — | — |
| content of (F) (weight %) 100 × (F)/{(A) + (B) + (D)} | 2.92 | 3.60 |
| storage stability (50° C.) | | |
| initial viscosity (poise) | 1.0 | 1.0 |
| viscosity after 30 days (poise) | 1.1 | 1.2 |
| curing conditions | 120° C. 30 min / 140° C. 30 min | 120° C. 30 min / 140° C. 30 min |
| properties of coating[1] | | |
| acid resistance 1 | good / good | good / good |
| acid resistance 2 | stain / good | stain / good |
| acid resistance 3 | good / good | good / good |
| impact resistance | good / good | good / good |
| weathering resistance | 81% / 85% | 88% / 93% |
| Knoop hardness | 8.2 / 10.4 | 8.7 / 10.5 |

(Part 4)

| Example | 56 | 57 |
|---|---|---|
| compound (A) | — | — |
| compound (B) | — | Cymel 303 |
| | | alkylated amino—methylol group |
| compound (D) | D-1 | D-2 |
| | epoxy group alkoxysilane group | hydroxyl group |
| thermal latent acid catalyst (F) | catalyst A | catalyst D |
| ratio of mixing solid | | |

TABLE 20-continued

| components | | | | |
|---|---|---|---|---|
| (A) | — | | — | |
| (B) | — | | 16.0 | |
| (D) | 100 | | 84.0 | |
| content of (F) (weight %) | 3.60 | | 2.92 | |
| 100 × (F)/{(A) + (B) + (D)} | | | | |
| storage stability (50° C.) | | | | |
| initial viscosity (poise) | 1.0 | | 1.0 | |
| viscosity after 30 days (poise) | 1.1 | | 1.2 | |
| curing conditions | 120° C. 30 min | 140° C. 30 min | 120° C. 30 min | 140° C. 30 min |
| properties of coating[1)] | | | | |
| acid resistance 1 | good | good | good | good |
| acid resistance 2 | stain | good | stain | good |
| acid resistance 3 | good | good | good | good |
| impact resistance | good | good | good | good |
| weathering resistance | 82% | 87% | 81% | 85% |
| Knoop hardness | 9.5 | 11.3 | 10.2 | 10.8 |

[1)]good: no change was observed; stain: slight stain was observed; cloud: surface was slightly cloudy.

EXAMPLES 58 TO 64

These examples show application of the composition to two coat one bake metallic color coating.

(1) Preparation of Clear Coating Compositions

One component clear coating compositions were prepared by mixing raw materials shown in Table 21. The clear coating compositions prepared were evaluated on storage stability by the same method as in Example 48 through 57. As shown in Table 22, increase of viscosity was very slight in all cases tested and coating materials were shown to have excellent storage stability.

2) Preparation of Test Pieces

Raw coating materials thus prepared were diluted by the same method as in Examples 48 through 57. Base test pieces were also prepared by the same method as in Examples 48 through 57. A silver metallic base coating composition BELCOAT No.6000® (a product of NOF CORPORATION) was applied to the base test piece by air spraying with interval of 1 minute 30 seconds in 2 stages in an amount to form a film having dried thickness of 15 μm. After the test piece was set at 20° C. for 3 minutes, the diluted raw clear coating compositions were coated by air spray coating and the test pieces were cured in the condition shown in Table 22 to prepare final test pieces.

Results of evaluation listed in Table 22 show that, in all cases, uniform coating films having good gloss were prepared and the coating showed excellent acid resistance, impact resistance, weathering resistance and hardness.

Weathering resistance was evaluated by the same method as in Table 6.

TABLE 21

| Example | 58 | 59 | 60 | 61 | 62 | 63 | 64 |
|---|---|---|---|---|---|---|---|
| compounding recipe in weight parts | | | | | | | |
| compound A-2 | 100 | — | — | — | — | — | — |
| compound A-4 | — | 50 | — | — | 50 | 50 | 50 |
| compound B-1 | — | 100 | — | — | 100 | 100 | 100 |
| compound B-2 | 100 | — | — | — | — | — | — |
| compound D-1 | — | — | 100 | — | — | — | — |
| compound D-2 | — | — | — | 100 | — | — | — |
| Cymel 303 | — | — | — | 10.5 | — | — | — |
| Modaflow | 0.2 | 0.1 | 0.1 | 0.1 | 0.1 | 0.1 | 0.1 |
| xylene | 5 | 4 | 3 | 3 | 4 | 4 | 4 |
| n-butyl acetate | 1 | 1 | 1 | 1 | 1 | 1 | 1 |
| acid catalyst F-14 | 4.0 | — | — | — | — | — | — |
| acid catalyst F-20 | — | 4.6 | — | — | — | — | — |
| acid catalyst F-15 | — | — | 2.1 | 1.9 | — | 4.6 | 2.9 |
| acid catalyst F-5 | — | — | — | — | 2.4 | — | — |

TABLE 22

| | (Part 1) | |
|---|---|---|
| Example | 58 | 59 |
| compound (A) | A-2 | A-4 |
| compound (B) | B-2 | B-1 |
| | alkoxysilane group | epoxy group |
| compound (D) | — | — |
| thermal latent acid catalyst (F) | catalyst F-14 | catalyst F-20 |
| ratio of mixing solid components | | |

TABLE 22-continued

| | | | | |
|---|---|---|---|---|
| (A) | 54.3 | | 37.1 | |
| (B) | 45.7 | | 62.9 | |
| (D) | — | | — | |
| content of (F) (weight %) 100 × (F)/{(A) + (B) + (D)} | 3.60 | | 5.73 | |
| storage stability (50° C.) | | | | |
| initial viscosity (poise) | 1.0 | | 1.0 | |
| viscosity after 30 days (poise) | 1.2 | | 1.1 | |
| curing conditions | 120° C. 30 min | 140° C. 30 min | 120° C. 30 min | 140° C. 30 min |
| properties of coating[1)] | | | | |
| acid resistance 1 | good | good | good | good |
| acid resistance 2 | good | good | good | good |
| acid resistance 3 | good | good | good | good |
| impact resistance | good | good | good | good |
| weathering resistance | good | good | good | good |
| Knoop hardness | 10.8 | 11.1 | 10.2 | 11.1 |

(Part 2)

| Example | 60 | | 61 | |
|---|---|---|---|---|
| compound (A) | — | | — | |
| compound (B) | — | | Cymel 303 alkylated amino-methylol group | |
| compound (D) | D-1 epoxy group alkoxysilane group | | D-2 hydroxyl group | |
| thermal latent acid catalyst (F) | catalyst F-15 | | catalyst F-15 | |
| ratio of mixing solid components | | | | |
| (A) | — | | — | |
| (B) | — | | 16.0 | |
| (D) | 100 | | 84.0 | |
| content of (F) (weight %) 100 × (F)/{(A) + (B) + (D)} | 3.60 | | 2.92 | |
| storage stability (50° C.) | | | | |
| initial viscosity (poise) | 1.0 | | 1.0 | |
| viscosity after 30 days (poise) | 1.1 | | 1.1 | |
| curing conditions | 120° C. 30 min | 140° C. 30 min | 120° C. 30 min | 140° C. 30 min |
| properties of coating[1)] | | | | |
| acid resistance 1 | good | good | good | good |
| acid resistance 2 | good | good | good | good |
| acid resistance 3 | good | good | good | good |
| impact resistance | good | good | good | good |
| weathering resistance | good | good | good | good |
| Knoop hardness | 10.1 | 10.5 | 10.4 | 11.0 |

(Part 3)

| Example | 62 | 63 | 64 |
|---|---|---|---|
| compound (A) | A-4 | A-4 | A-4 |
| compound (B) | B-1 epoxy group | B-1 epoxy group | B-1 epoxy group |
| compound (D) | — | — | — |
| thermal latent acid catalyst (F) | catalyst F-5 | catalyst F-20 | catalyst F-15 |
| ratio of mixing solid components | | | |
| (A) | 37.1 | 37.1 | 37.1 |
| (B) | 62.9 | 62.9 | 62.9 |
| (D) | — | — | — |
| content of (F) (weight %) 100 × (F)/{(A) + (B) + (D)} | 2.92 | 5.73 | 3.60 |
| storage stability (50° C.) | | | |
| initial viscosity | 1.0 | 1.0 | 1.0 |

TABLE 22-continued

| | | | | | | |
|---|---|---|---|---|---|---|
| (poise) | | | | | | |
| viscosity after 30 days (poise) | 1.4 | | 1.3 | | 1.2 | |
| curing condition | 120° C. 30 min | 140° C. 30 min | 120° C. 30 min | 140° C. 30 min | 120° C. 30 min | 140° C. 30 min |
| properties of coating[1] | | | | | | |
| acid resistance 1 | good | good | good | good | good | good |
| acid resistance 2 | good | good | good | good | good | good |
| acid resistance 3 | good | good | good | good | good | good |
| impact resistance | good | good | good | good | good | good |
| weathering resistance | good | good | good | good | good | good |
| Knoop hardness | 11.2 | 11.9 | 10.0 | 10.9 | 9.9 | 10.7 |

[1] good: no change was observed.

EXAMPLES 65 TO 71

Thermal latent acid catalysts F-23 to F-29 were prepared by the following method.

Into test tubes, 10 weight parts each of ethyl acetate were charged and the components for the thermal latent acid catalysts shown in Table 23 were added to the solutions under stirring. The test tubes were left standing for 3 hours and, after removing the solvent by distillation, thermal latent acid catalysts F-23 to F-29 shown in Table 23 were obtained.

Methyl phosphate shown in Table 23 is a mixture of monomethyl phosphate and dimethyl phosphate.

TABLE 23

| Example | 65 | 66 | 67 | 68 | 69 | 70 | 71 |
|---|---|---|---|---|---|---|---|
| thermal latent acid catalyst | F-23 | F-24 | F-25 | F-26 | F-27 | F-28 | F-29 |
| compounding recipe in weight parts | | | | | | | |
| Lewis acid | | | | | | | |
| zinc chloride | 1.36 | 1.36 | 1.36 | — | — | — | — |
| zinc bromide | — | — | — | 2.25 | 2.25 | 2.25 | — |
| zinc octanoate | — | — | — | — | — | — | 3.52 |
| Bronsted acid | | | | | | | |
| dodecylbenzenesulfonic acid | 6.53 | — | — | 6.53 | — | — | 3.27 |
| dichloroacetic acid | — | 2.58 | — | — | 2.58 | — | — |
| methyl phosphate | — | — | 1.62 | — | — | 1.62 | — |
| solvent | | | | | | | |
| ethyl acetate | 10.0 | 10.0 | 10.0 | 10.0 | 10.0 | 10.0 | 10.0 |
| yield (weight part) | 7.5 | 3.7 | 2.7 | 8.3 | 4.6 | 3.6 | 6.6 |
| yield (%) | 95 | 94 | 91 | 95 | 95 | 93 | 97 |

EXAMPLE 72

Example of preparation of material 9; an acrylic resin comprising carboxyl group H-1 was synthesized by the following method.

Into a 2 l four-necked flask equipped with a cooler, a thermometer, a stirrer and a dropping funnel, 488 weight parts of methyl isobutylketone were charged and heated to 100° C. To the heated solvent, a mixture of 77 weight parts of methacrylic acid, 194 weight parts of methyl methacrylate, 221 weight parts of n-butyl acrylate and 20 weight parts of 2,2'-azo-bis-isobutyronitrile was dropped during 2 hours and the reaction mixture was kept at 100° C. for further 2.5 hours for reaction to obtain a solution containing resin H-1 having the acid value of 100 mg KOH/g, the solid content of 51.6 weight % and the number average molecular weight of 3000.

To a mixture of 100 weight parts of the solution of polycarboxylic acid H-1, 11.9 weight parts of an epoxy hardener ERL-4221 (a product of Union Carbide Co.) and 45 weight parts of xylene, 3.85 weight parts of the thermal latent acid catalyst F-23 prepared in Example 65 were added to prepare a thermosetting composition. The thermosetting composition was applied to a piece of tinplate by flow coating and baked at 140° C. for 30 minutes. Knoop hardness of the coating was measured to evaluate the catalytic activity of a catalyst. Number of day elapsed until gellation of a thermosetting composition on storage at 30° C. was measured to evaluate the thermal latent ability of a catalyst. Compositions of the thermosetting compositions used and results of the evaluation are shown in Table 24.

TABLE 24

| Example | 72 | 73 | 74 | 75 | 76 | 77 | 78 | — | — |
|---|---|---|---|---|---|---|---|---|---|
| Comparative example | — | — | — | — | — | — | — | 22 | 23 |
| composition of thermosetting composition (weight part) | | | | | | | | | |
| resin solution of Example of preparation of material 1 | 100 | 100 | 100 | 100 | 100 | 100 | — | 100 | 100 |
| ERL-4221 | 11.9 | 11.9 | 11.9 | 11.9 | 11.9 | 11.9 | — | 11.9 | 11.9 |
| xylene | 45 | 45 | 45 | 45 | 45 | 45 | — | 45 | 45 |
| thermal latent acid catalyst | | | | | | | | | |
| F-23 | 3.85 | — | — | — | — | — | — | — | — |
| F-24 | — | 1.91 | — | — | — | — | — | — | — |
| F-25 | — | — | 1.45 | — | — | — | — | — | — |
| F-26 | — | — | — | 4.27 | — | — | — | — | — |
| F-27 | — | — | — | — | 2.35 | — | — | — | — |
| F-28 | — | — | — | — | — | 1.88 | — | — | — |
| F-29 | — | — | — | — | — | — | 3.29 | — | — |
| zinc chloride | — | — | — | — | — | — | — | — | 0.66 |
| properties | | | | | | | | | |
| Knoop hardness 11 | 11 | 11 | 10 | 11 | 11 | 10 | 11 | 7 | 11 |
| time to gellation | 45 | 40 | 49 | 42 | 41 | 47 | 50 | 53 | 1 |

TABLE 24-continued

| Example | 72 | 73 | 74 | 75 | 76 | 77 | 78 | — | — |
|---|---|---|---|---|---|---|---|---|---|
| Comparative example | — | — | — | — | — | — | — | 22 | 23 |
| at 30° C. (day) | | | | | | | | | |

EXAMPLES 73 TO 78

Thermosetting compositions were prepared by using thermal latent acid catalysts prepared in Examples 66 to 71 and evaluated by the same method as in Example 69. Results are shown in Table 24.

COMPARATIVE EXAMPLE 22

A thermosetting composition was prepared and evaluated by the same method as in Example 69 except that no thermal latent acid catalyst was used. Results are shown in Table 24.

COMPARATIVE EXAMPLE 23

A thermosetting composition was prepared and evaluated by the same method as in Example 69 except that zinc chloride was used in Comparative example 23 in place of the thermal latent acid catalyst in Example 69. Results are shown in Table 24.

The results in Table 24 show that the thermosetting compositions using the thermal latent acid catalysts of the invention had excellent storage stability and sufficient curing reactivity simultaneously while the thermosetting composition containing no thermal latent acid catalyst in Comparative example 22 showed insufficient curing though it had good storage stability and the thermosetting composition containing zinc chloride catalyst in place of the thermal latent acid catalyst in Comparative example 23 showed insufficient storage stability though it had good curing reactivity.

EXAMPLES 79 TO 81

These examples show application of the composition to two coat one bake metallic color coating.

(1) Preparation of Clear Coating Compositions

One component clear coating compositions were prepared by mixing raw materials shown in Table 25 and evaluated on storage stability at 30° C. As shown in Table 26, increase of viscosity was very slight in all cases tested and coating materials were shown to have excellent storage stability.

2) Preparation of Test Pieces

Raw coating materials thus prepared were diluted by the same method as in Examples 1 to 11. Base test pieces were also prepared by the same method as in Examples 1 to 11. A silver metallic base coating composition BELCOAT No.6000 ® (a product of NOF CORPORATION) was applied to the base test piece by air spraying with interval of 1 minute 30 seconds in 2 stages in an amount to form a film having dried thickness of 15 μm. After the test piece was set at 20° C. for 3 minutes, the diluted raw clear coating compositions were coated by air spray coating and the test pieces were cured in the condition shown in Table 26 to prepare final test pieces.

Results of evaluation listed in Table 26 show that, in all cases, uniform coating films having good gloss were prepared and the coating showed excellent acid resistance, impact resistance, weathering resistance and hardness.

Weathering resistance was evaluated by the same method as in Table 6.

TABLE 25

| Example | 79 | 80 | 81 |
|---|---|---|---|
| compounding recipe in weight parts | | | |
| compound A-2 | 100 | — | — |
| compound A-4 | — | 50.0 | — |
| compound B-2 | 100 | — | — |
| compound B-1 | — | 100 | — |
| compound D-1 | — | — | 100 |
| Modaflow | 0.2 | 0.1 | 0.1 |
| catalyst F-29 | 5.75 | 4.2 | 3.0 |
| xylene | 3.5 | 3.0 | 2.0 |
| n-butyl acetate | 0.9 | 0.8 | 0.5 |

TABLE 26

| Example | 79 | 80 | 81 |
|---|---|---|---|
| compound (A) | A-2 | A-4 | — |
| compound (B) | B-2 | B-1 | — |
| | alkoxysilane group | epoxy group | |
| compound (D) | — | — | D-1 |
| | | | epoxy group alkoxysilane group |
| acid catalyst (F) | F-29 | F-29 | F-29 |
| ratio of mixing solid components | | | |
| (A) | 54.3 | 37.1 | — |
| (B) | 45.7 | 62.9 | — |
| (D) | — | — | 100 |
| content of (F) (weight %) 100 × (F)/{(A) + (B) + (D)} | 5.21 | 5.21 | 5.21 |
| storage stability (30° C.) | | | |
| initial viscosity (poise) | 1.0 | 1.0 | 1.0 |
| viscosity after 30 days (poise) | 1.2 | 1.1 | 1.2 |
| curing condition properties of coating[1] | 120° C. × 30 min | 120° C. × 30 min | 120° C. × 30 min |
| acid resistance 1 | good | good | good |

TABLE 26-continued

| Example | 79 | 80 | 81 |
|---|---|---|---|
| acid resistance 2 | good | good | good |
| acid resistance 3 | good | good | good |
| impact resistance | good | good | good |
| weathering resistance | good | good | good |
| Knoop hardness | 11.3 | 12.1 | 12.0 |

[1] good: no change was observed.

EXAMPLES 82 TO 85

Compounds having oxazoline group were applied by the following method.

(1) Preparation of Clear Coating Material

Components summarized in Table 27 were utilized for the preparation of the one component clear coating materials. The clear coating compositions prepared were diluted with thinner (a mixture of xylene and butyl acetate in 8 to 2 weight ratio) to the viscosity of 1 poise (measured by Brookfield type viscometer at 20° C.) and stored in a sealed condition at 30° C. After the coating compositions were stored for 30 days at 30° C., viscosity was measured. The results summarized in Table 27 show that the increase of viscosity was very slight in all cases and that the coating materials had excellent storage stability.

(2) Preparation of Test Piece

Cationic electrodeposit paint AQUA No.4200® (a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coating paint EPICO No.1500CP Sealer® (a product of NOF CORPORATION) was applied to the prepared plate by air spraying in an amount to form a film having dried thickness of 40 μm and the plate was baked at 140° C. for 30 minutes to obtain a base test piece.

The raw coating materials prepared in (1) were diluted with thinner (a mixture of xylene and butyl acetate in 8 to 2 ratio) to a viscosity required for spraying (25 seconds at 20° C. by Ford cup No. 4) and applied to the base test piece prepared before by air spray coating. Test pieces were prepared by curing the coated pieces in the conditions shown in Table 27.

Results of the evaluation of coatings are shown in Table 27. In all cases, uniform coating having good gloss were prepared. All the coatings showed excellent acid resistance, impact resistance, weathering resistance and hardness.

Weathering resistance was evaluated by the same method as in Table 6.

TABLE 27

| Example | 82 | 83 | 84 | 85 |
|---|---|---|---|---|
| compounding recipe in weight parts | | | | |
| thermal latent carboxyl compound A-5 in Example of preparation of material 4 (3) | 29.4 | 29.4 | 29.4 | 29.4 |
| CX-RS-1200 | 100 | 100 | — | — |
| CX-RS-3200 | — | — | 100 | 100 |
| acid catalyst A | 15.4 | — | 15.4 | — |
| acid catalyst B | — | 6.3 | — | 6.3 |
| storage stability (30° C.) | | | | |
| initial viscosity (poise) | 0.9 | 0.9 | 0.9 | 0.9 |

TABLE 27-continued

| Example | 82 | 83 | 84 | 85 |
|---|---|---|---|---|
| viscosity after 30 days (poise) | 1.7 | 1.8 | 1.7 | 1.8 |
| properties of coating[1] | | | | |
| acid resistance 1 | good | good | good | good |
| acid resistance 2 | good | good | good | good |
| acid resistance 3 | good | good | good | good |
| impact resistance | good | good | good | good |
| weathering resistance | 85% | 83% | 88% | 84% |
| Knoop hardness | 7.0 | 11.9 | 10.2 | 13.6 |

[1] good: no change was observed.

COMPARATIVE EXAMPLES 24 AND 25

Clear coating materials were prepared by using materials of the compositions shown in Table 28 and evaluated on storage stability by the same method as in Examples 82 to 85. The clear coating materials prepared here all gelled after 14 days because they comprised no thermal latent carboxylic acid.

TABLE 28

| Comparative example | 24 | 25 |
|---|---|---|
| compounding recipe in weight parts | | |
| thermal latent carboxyl compound A-4(a) in Example of preparation of material 4 (1) | 24.6 | 24.6 |
| CX-RS-1200 | 100 | — |
| CX-RS-3200 | — | 100 |
| acid catalyst B | 6.3 | 6.3 |
| storage stability (30° C.) | | |
| initial viscosity (poise) | 0.9 | 0.9 |
| viscosity after 30 days (poise) | gel after 14 days | gel after 14 days |
| properties of coating[1] | | |
| acid resistance 1 | good | good |
| acid resistance 2 | good | good |
| acid resistance 3 | good | good |
| impact resistance | good | good |
| weathering resistance | 81% | 85% |
| Knoop hardness | 11.8 | 12.5 |

[1] good: no change was observed.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, the thermosetting composition of the invention gives cured products having excellent chemical properties, physical properties, weathering resistance and storage stability and is advantageously utilized for coating compositions, ink, adhesive and molded plastics. Particularly when it is utilized as a top coat material, it discharges little amount of organic solvents into air, gives excellent appearance to the finished articles and is advantageously applied to the field of industrial coating such as coating of automobiles.

The thermal latent acid catalyst of the invention has excellent storage stability and heat curing reactivity when it is applied to the thermosetting composition and advantageously utilized.

What is claimed is:

1. A thermosetting composition which comprises:
   (A) a compound having in the molecule two or more functional groups of the formula (1):

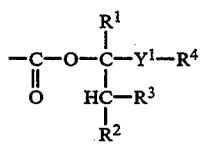

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hereto atom component;
   (B) a compound having in the molecule two or more reactive functional groups which can form a chemical bond with the functional groups of the compound (A) by heating, the reactive functional groups of the compound (B) are at least one kind selected from the group consisting of epoxy group, silanol group, alkoxysilane group, hydroxyl group, amino group, imino group, isocyanate group, blocked isocyanate group, cyclocarbonate group, vinyl ether group, vinyl thioether group, aminomethylol group, alkylated aminomethylol group, acetal group and ketal group; and, optionally,
   (C) a thermal latent acid catalyst which is activated during curing of the composition by heating.

2. The thermosetting composition as claimed in claim 1 wherein the thermal latent acid catalyst (C) is at least one kind selected from the group consisting of a compound prepared by neutralizing a protonic acid or a Lewis acid with a Lewis base, an ester of a sulfonic acid, an ester of phosphoric acid and an ,onium compound or a compound prepared by mixing a Lewis acid with trialkyl phosphate.

3. The thermosetting composition as claimed in claim 2, wherein the compound (A) and/or the compound (B) are polymers of $\alpha,\beta$-unsaturated compounds.

4. The thermosetting composition as claimed in claim 2, wherein the compound (A) and/or the compound (B) are polyester resins.

5. The thermosetting composition as claimed in claim 1, wherein the compound (A) and/or the compound (B) are polymers of $\alpha,\beta$-unsaturated compounds.

6. The thermosetting composition as claimed in claim 1, wherein the thermal latent acid catalyst (C) is at least one kind selected from the group consisting of a compound prepared by neutralizing a protonic acid or a Lewis acid with a Lewis base, an ester of a sulfonic acid, an ester of phosphoric acid and an onium compound or a compound prepared by mixing a Lewis acid with trialkyl phosphate.

7. The thermosetting composition as claimed in claim 1, wherein the compound (A) and the compound (B) are polymers of $\alpha,\beta$-unsaturated compounds.

8. The thermosetting composition as claimed in claim 1, wherein the compound (A) and/or the compound (B) are polyester resins.

9. The thermosetting composition as claimed in claim 1, wherein compound (A) is a compound prepared by the half-esterification of (i) a polyol having two or more hydroxyl groups in the molecule and (ii) an acid anhydride; and compound (B) is an acrylic resin having two or more epoxy groups in the molecule.

10. The thermosetting composition as claimed in claim 1, wherein the thermal latent acid catalyst (C) is prepared by neutralizing a Lewis acid with a Lewis base, the Lewis acid being zinc octanoate and the Lewis base being triethylphosphate.

11. The thermosetting composition as claimed in claim 1, wherein an equivalent ratio of the functional groups of the compound (A) and the reactive functional groups of the compound (B) is 0.2:1.0 to 1.0:0.2.

12. The thermosetting composition as claimed in claim 1, wherein an amount of the thermal latent acid catalyst is 0.01 to 10 weight parts per 100 weight parts of a total solid component of the compound (A) and the compound (B).

13. The thermosetting composition as claimed in claim 1, wherein the compound (A) has 2 to 50 functional groups of the formula ( 1 ) in the molecule.

14. The thermosetting composition as claimed in claim 13, wherein the compound (B) has 2 to 50 reactive functional groups in the molecule.

15. The thermosetting composition as claimed in claim 1, wherein the compound (A) is a thermal latent carboxyl compound prepared by reaction of a polycarboxyl compound prepared by a half esterification of a polyol having two or more hydroxyl groups in the molecule and an acid hydride with a vinyl ether compound, whereby the carboxyl group is transformed into the functional group of the formula (1).

16. The thermosetting composition as claimed in claim 15, wherein the vinyl ether compound is an aliphatic vinyl ether compound having 3 to 10 carbon atoms.

17. The thermosetting composition as claimed in claim 15, wherein the vinyl ether compound is an aliphatic vinyl ether compound having 4 to 10 carbon atoms.

18. The thermosetting composition as claimed in claim 15, wherein the vinyl ether compound is selected from the group consisting of methyl vinyl ether, ethyl vinyl ether, isopropyl vinyl ether, n-propyl vinyl ether, n-butyl vinyl ether, isobutyl vinyl ether, 2-ethylhexyl vinyl ether and cyclohexyl vinyl ether.

19. The thermosetting composition as claimed in claim 1, wherein the compound (B) is a compound having two or more epoxy groups in the molecule.

20. The thermosetting composition, as claimed in claim 1, wherein the compound (B) is a polymer of an $\alpha,\beta$-unsaturated compound.

21. The thermosetting composition claimed in claim 1, wherein the compound (A) is a polymer of an $\alpha,\beta$-unsaturated compound.

22. A method of coating which comprises coating a substrate with a top coating material comprising pigments and the thermosetting composition claimed in claim 1, the amount of the pigments being 0 to 100 weight parts based on 100 weight parts of the thermosetting composition.

23. A method of coating which comprises coating a substrate with a composite coating layer by forming a base coat on the substrate with a composition forming a colored film, followed by forming a clear top coat on the base coat with a composition forming a clear film, the composition forming a clear film alone or both of the composition forming a clear film and the composition forming a colored film comprising the thermosetting composition claimed in claim 1.

24. A method of coating which comprises coating a substrate with a top coating material comprising pigments and a thermosetting composition, the pigments being in an amount of 0 to 100 weight parts based on 100 weight parts of the thermosetting composition, wherein the thermosetting composition is as claimed in claims 2, 3, 4, 5, 6, 7, 8, 9, 10, 11, 12, 13, 14, 15, 16, 17, 18, 19, 20 or 21.

25. A method of coating which comprises coating a substrate with a composite coating layer by forming a base coat on the substrate with a composition forming a colored film, followed by forming a clear top coat on the base coat with a composition forming a clear film, the composition forming a clear film alone or both of the composition forming a clear film and the composition forming a colored film comprising the thermosetting composition, wherein the thermosetting composition is as claimed in claims 3, 4, 5, 6, 7, 8, 9, 10, 11, 12, 13, 14, 15, 16, 17, 18, 19, 20, 21 or 24.

26. A thermosetting composition which comprises:
(A) a compound having in the molecule two or more functional groups of the formula (1):

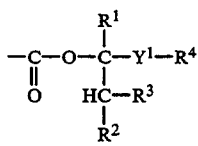
(1)

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hetero atom component;
(B) a compound having in the molecule two or more reactive functional groups which can form chemical bonds with the functional groups of the compound (A) by heating, the reactive functional groups of the compound (B) are groups of at least one kind selected from the group consisting of epoxy group, oxazoline group, silanol group, alkoxysilane group, hydroxyl group, amino group, imino group, isocyanate group, blocked isocyanate group, cyclocarbonate group, vinyl ether group, vinyl thioether group, aminomethylol group, alkylated aminomethylol group, acetal group and ketal group; and
(F) a complex compound formed by coordination of a conjugated base of a Bronsted acid or a Bronsted salt to a vacant orbital of a Lewis acid in a mol ratio of the Bronsted acid or Bronsted salt to the vacant orbital of the Lewis acid of 0.1 to 4.

27. A thermosetting composition as claimed in claim 26, wherein the compound (A) and/or the compound (B) are polymers of $\alpha,\beta$-unsaturated compounds.

28. A thermosetting composition as claimed in claim 26, wherein the compound (A) and/or the compound (B) are polyester resins.

29. The thermosetting composition as claimed in claim 26, wherein compound (A) is a compound prepared by a half-esterification of (i) a polyol having two or more hydroxyl groups in the molecule and (ii) an acid anhydride; compound (B) is an acrylic resin having two or more epoxy groups in the molecule; and the Lewis acid is zinc octanoate.

30. A method of coating which comprises coating a substrate with a top coating material comprising pigments and the thermosetting composition claimed in claim 26, claim 27, claim 28 or claim 29, the amount of the pigments being 0 to 100 weight parts based on 100 weight parts of the thermosetting composition.

31. A method of coating which comprises coating a substrate with a composite coating layer by forming a base coat on the substrate with a composition forming a colored film, followed by forming a clear top coat on the base coat with a composition forming a clear film, the composition forming a clear film alone or both of the composition forming a clear film and the composition forming a colored film comprising the thermosetting composition claimed in claim 26, claim 27, claim 28 or claim 29.

32. Thermosetting compositions which comprise: (A) a compound having in the molecule two or more functional groups of the formula [1]:

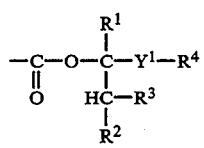
[1]

wherein $R^1$, $R^2$ and $R^3$ are respectively selected from the group consisting of hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hetero atom component; (G) a compound having two or more oxazoline groups in the molecule; and, optionally, (C) a thermal latent acid catalyst which is activated during curing of the composition by heating.

33. Thermosetting compositions as claimed in claim 32 wherein the thermal latent acid catalyst (C) is at least one kind selected from the group consisting of a compound prepared by neutralizing a Brønsted acid or a Lewis base, a complex compound formed from a Lewis acid and a Brønsted acid, a complex compound formed from a Lewis acid and a Brønsted salt, an ester of a sulfonic acid an ester of phosphoric acid and an onium compound.

34. Thermosetting compositions as claimed in claim 32 wherein the compound (A) and/or the compound (G) are polymers of $\alpha,\beta$-unsaturated compounds.

35. Thermosetting compositions as claimed in claim 32 wherein the compound (A) and/or the compound (G) are polyester resins.

36. A thermosetting composition which comprises:

(A) a compound having in the molecule two or more functional groups of the formula (1):

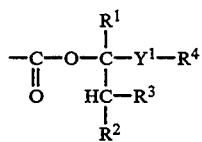 (1)

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hereto atom component;

(B) a compound having in the molecule two or more reactive functional groups which can form a chemical bond with the functional groups of the compound (A) by heating, the reactive functional groups of the compound (B) being oxazoline groups and, optionally, (C) a thermal latent acid catalyst which is activated during curing of the composition by heating.

* * * * *